(12) United States Patent
Jung et al.

(10) Patent No.: US 8,424,089 B2
(45) Date of Patent: *Apr. 16, 2013

(54) VIRUS IMMUNIZATION USING PRIORITIZED ROUTING

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 591 days.

This patent is subject to a terminal disclaimer.

(21) Appl. No.: 11/526,062

(22) Filed: Sep. 22, 2006

(65) Prior Publication Data

US 2007/0261119 A1 Nov. 8, 2007

Related U.S. Application Data

(63) Continuation-in-part of application No. 11/413,969, filed on Apr. 27, 2006, now Pat. No. 7,917,956.

(51) Int. Cl.
*H04L 29/06* (2006.01)
(52) U.S. Cl.
USPC .............. 726/24; 726/22; 726/23; 726/25; 713/187; 713/188; 709/223; 709/224
(58) Field of Classification Search .............. 726/22–26, 726/11–14; 713/151, 187–188; 714/4; 709/238–244, 223–224

See application file for complete search history.

(56) References Cited

U.S. PATENT DOCUMENTS

| | | | |
|---|---|---|---|
| 5,414,833 | A | 5/1995 | Hershey et al. |
| 5,416,842 | A | 5/1995 | Aziz |
| 5,987,610 | A | 11/1999 | Franczek et al. |
| 6,081,894 | A | 6/2000 | Mann |
| 6,311,277 | B1 | 10/2001 | Takaragi et al. |
| 6,374,303 | B1 * | 4/2002 | Armitage et al. ............. 709/242 |
| 6,732,279 | B2 * | 5/2004 | Hoffman ........................ 726/24 |
| 6,851,057 | B1 | 2/2005 | Nachenberg |
| 7,010,696 | B1 | 3/2006 | Cambridge et al. |
| 7,020,150 | B2 | 3/2006 | Ho et al. |

(Continued)

FOREIGN PATENT DOCUMENTS

EP 1564623 A1 8/2005

OTHER PUBLICATIONS

Guide to Malware Incident Prevention and Handling by Mell et al; Published by National Institute of Standards and Technology; Date: Nov. 2005.*

(Continued)

*Primary Examiner* — Madhuri Herzog

(57) ABSTRACT

An apparatus, device, methods, computer program product, and system are described that determine a virus associated with communication data on a communications network, the communications network associated with at least one network policy device, associate an anti-viral agent with at least one identifier, prioritize transmission of the at least one identifier through the at least one network policy device, relative to the communication data, and provide the anti-viral agent on the communications network, in response to the prioritizing transmission of the at least one identifier through the at least one network policy device.

54 Claims, 24 Drawing Sheets

U.S. PATENT DOCUMENTS

| | | | |
|---|---|---|---|
| 7,530,104 B1* | 5/2009 | Thrower et al. | 726/22 |
| 7,571,483 B1 | 8/2009 | Bascle et al. | |
| 7,647,411 B1 | 1/2010 | Schiavone et al. | |
| 8,117,654 B2 | 2/2012 | Jung et al. | |
| 2002/0161918 A1 | 10/2002 | Asano et al. | |
| 2002/0174358 A1* | 11/2002 | Wolff et al. | 713/200 |
| 2003/0115483 A1 | 6/2003 | Liang | |
| 2004/0015718 A1 | 1/2004 | DeClouet | |
| 2004/0073701 A1* | 4/2004 | Huang et al. | 709/240 |
| 2004/0088564 A1 | 5/2004 | Norman | |
| 2005/0050378 A1* | 3/2005 | Liang | 714/4 |
| 2005/0120229 A1* | 6/2005 | Lahti | 713/188 |
| 2005/0120231 A1 | 6/2005 | Harada et al. | |
| 2005/0182949 A1* | 8/2005 | Phillips et al. | 713/189 |
| 2005/0204150 A1* | 9/2005 | Peikari | 713/188 |
| 2005/0288961 A1 | 12/2005 | Tabrizi | |
| 2006/0053490 A1 | 3/2006 | Herz et al. | |
| 2006/0072527 A1 | 4/2006 | Beck et al. | |
| 2006/0075134 A1* | 4/2006 | Aalto et al. | 709/238 |
| 2006/0095961 A1* | 5/2006 | Govindarajan et al. | 726/15 |
| 2006/0095965 A1 | 5/2006 | Phillips et al. | |
| 2006/0190606 A1* | 8/2006 | Kohavi | 709/226 |
| 2006/0218635 A1 | 9/2006 | Kramer et al. | |
| 2007/0002838 A1 | 1/2007 | Komura et al. | |
| 2007/0101422 A1 | 5/2007 | Carpenter | |
| 2007/0101430 A1 | 5/2007 | Raikar | |
| 2008/0005784 A1 | 1/2008 | Miliefsky | |

OTHER PUBLICATIONS

PCT International Search Report; International App. No. PCT/US07/14564; Mar. 26, 2008; pp. 1-2.

PCT International Search Report; International App. No. PCT/US07/10140; May 8, 2008; pp. 1-2.

PCT International Search Report; International App. No. PCT/US07/14579; Jun. 20, 2008; pp. 1-2.

Bontchev, Vesselin; "Are 'Good' Computer Viruses Still a Bad Idea?"; pp. 1-29; University of Hamburg; located at: http://vx.netlus.ort/lib/avb02.html; printed on: Mar. 1, 2006.

"Cisco—MPLS FAQ for Beginners"; Bearing dates of 1992-2006 and May 8, 2006; pp. 1-7; Cisco Systems, Inc.; printed on May 21, 2006; located at: http://www.cisco.com/warp/public/105/mpls_faq_4649.shtml.

Goel, Sanjay and Bush, Stephen F.; "Biological Models of Security for Virus Propagation in Computer Networks"; pp. 1-7; located at: http://www.albany.edu/~goel/publiications/goelloginl2004.pdf.

Goldenberg et al.; "Distributive immunization of networks against viruses using the 'honey-pot' architecture"; Bearing a date of Dec. 1, 2005; pp. 1-5; Nature Physics.

Somayaji et al.; "Principles of a Computer Immune System"; Department of Computer Science, University of New Mexico; Bearing dates of 1997 & 1998; pp. 75-82; New Security Paradigms Workshop; located at: http://www.cs.unm.edu/~immsec/publications/nspw-97.pdf.

"TRILLIUM—Multiprotocol Label Switching (MPLS)"; Web ProForum Tutorials; pp. 1-24; The International Engineering Consortium; located at: http://www.iec.org.

Wang et al.; "On Computer Viral Infection and the Effect of Immunization"; pp. 1-11; Department of Computer Science, University of Virginia; located at: http://csdl2.computer.org/persagen/DLAbsToc.jsp?resourcePath=/dl/proceedings/&toc=comp/proceedings/acsac/2000/0859/00/0859toc.xml&DOI=10.1109/ACSAC.2000.898879.

U.S. Appl. No. 11/601,605, Jung et al.
U.S. Appl. No. 11/526,213, Jung et al.
U.S. Appl. No. 11/513,901, Jung et al.
U.S. Appl. No. 11/492,691, Jung et al.
U.S. Appl. No. 11/492,689, Jung et al.
U.S. Appl. No. 11/487,595, Jung et al.
U.S. Appl. No. 11/486,975, Jung et al.

Chinese Patent Office official action; App. No. 200780015273.1 based on PCT/US07/010140 ; Aug. 24, 2010; pp. 1-6. (No Translation Currently Available).

European Patent Office Search Report; App. No. EP 07 86 1294; Apr. 13, 2012 pp. 1-6.

* cited by examiner

VIRUS IMMUNIZATION USING PRIORITIZED ROUTING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

1. For purposes of the USPTO extra-statutory requirements referenced below, the present application constitutes a continuation in part of currently co-pending U.S. patent application entitled Multi-Network Virus Immunization, naming Edward K.Y. Jung, Royce A. Levien, Robert W. Lord, Mark A. Malamud, John D. Rinaldo, Jr., and Lowell L. Wood, Jr., as inventors, U.S. application Ser. No.: 11/413,969, filed Apr. 27, 2006 now U.S. Pat. No. 7,917,956.

The United States Patent Office (USPTO) has published a notice to the effect that the USPTO's computer programs require that patent applicants both reference a serial number and indicate whether an application is a continuation or continuation-in-part. Stephen G. Kunin, *Benefit of Prior-Filed Application*, USPTO Official Gazette Mar. 18, 2003, available on the website of the USPTO at www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part, " for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent that such subject matter is not inconsistent herewith.

SUMMARY

An embodiment provides a method. In one implementation, the method includes but is not limited to determining a virus associated with communication data on a communications network, the communications network associated with at least one network policy device, associating an anti-viral agent with at least one identifier, prioritizing transmission of the at least one identifier through the at least one network policy device, relative to the communication data, and providing the anti-viral agent on the communications network, in response to the prioritizing transmission of the at least one identifier through the at least one network policy device. In addition to the foregoing, other method aspects are described in the claims, drawings, and text forming a part of the present disclosure.

An embodiment provides a computer program product. In one implementation, the computer program product includes but is not limited to a signal-bearing medium bearing at least one or more instructions for determining a virus associated with communication data on a communications network, the communications network associated with at least one network policy device, one or more instructions for associating an anti-viral agent with at least one identifier, one or more instructions for prioritizing transmission of the at least one identifier through the at least one network policy device, relative to the communication data, and one or more instructions for providing the anti-viral agent on the communications network, responsive to the one or more instructions for prioritizing transmission of the at least one identifier through the at least one network policy device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to determine a virus associated with communication data on a communications network, the communications network associated with at least one network policy device, associate an anti-viral agent with at least one identifier, prioritize transmission of the at least one identifier through the at least one network policy device, relative to the communication data, and provide the anti-viral agent on the communications network, in response to the prioritizing transmission of the at least one identifier through the at least one network policy device. In addition to the foregoing, other system aspects are described in the claims, drawings, and text forming a part of the present disclosure.

An embodiment provides a device. In one implementation, the device includes but is not limited to a multi-network immunization system, and the multi-network virus immunization system includes but is not limited to a network monitor operable to determine a virus associated with communication data on a communications network, the communications network associated with at least one network policy device, identifier logic operable to associate an anti-viral agent with at least one identifier, and routing logic operable to prioritize transmission of the at least one identifier through the at least one network policy device, relative to the communication data, and further operable to provide the anti-viral agent on the communications network. In addition to the foregoing, other device aspects are described in the claims, drawings, and text forming a part of the present disclosure.

An embodiment provides a method. In one implementation, the method includes but is not limited to receiving information associated with a virus via at least one network policy device, the virus associated with communication data on a communications network, prioritizing transmission of at least one identifier through the at least one network policy device, relative to the communication data, the at least one identifier being associated with an anti-viral agent, and outputting the at least one identifier from the at least one network policy device, for provision of the anti-viral agent on the communications network, based thereon. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for receiving information associated with a virus via at least one network policy device, the virus associated with communication data on a communications network, one or more instructions for prioritizing transmission of at least one identifier through the at least one network policy device, relative to the communication data, the at least one identifier being associated with an anti-viral agent, and one or more instructions for outputting the at least one identifier from the at least one network policy device, for provision of the anti-viral agent on the communications network, based thereon. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to receive information associated with a virus via at least one network policy device, the virus associated with communication data on a communications network, prioritize transmission of at least one identifier through the at least one network policy device, relative to the communication data, the at least one identifier being associated with an anti-viral agent, and output the at least one identifier from the at least one network policy device, for provision of the anti-viral agent on the communications network, based thereon. In addition to the foregoing, other system aspects are described in the claims, drawings, and text forming a part of the present disclosure.

An embodiment provides a network policy device. In one implementation, the device includes but is not limited to a multi-network virus immunization system. The multi-network virus immunization system includes but is not limited to identifier logic operable to receive information associated with a virus at the network policy device, the virus associated with communication data on a communications network, and further operable to associate at least one identifier with an anti-viral agent, and router logic operable to prioritize transmission of the at least one identifier through the at least one network policy device, relative to the communication data, and further operable to output the at least one identifier from the at least one network policy device, for provision of the anti-viral agent on the communications network, based thereon. In addition to the foregoing, other device aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

The use of the same symbols in different drawings typically indicates similar or identical items.

DETAILED DESCRIPTION

Figure 1:
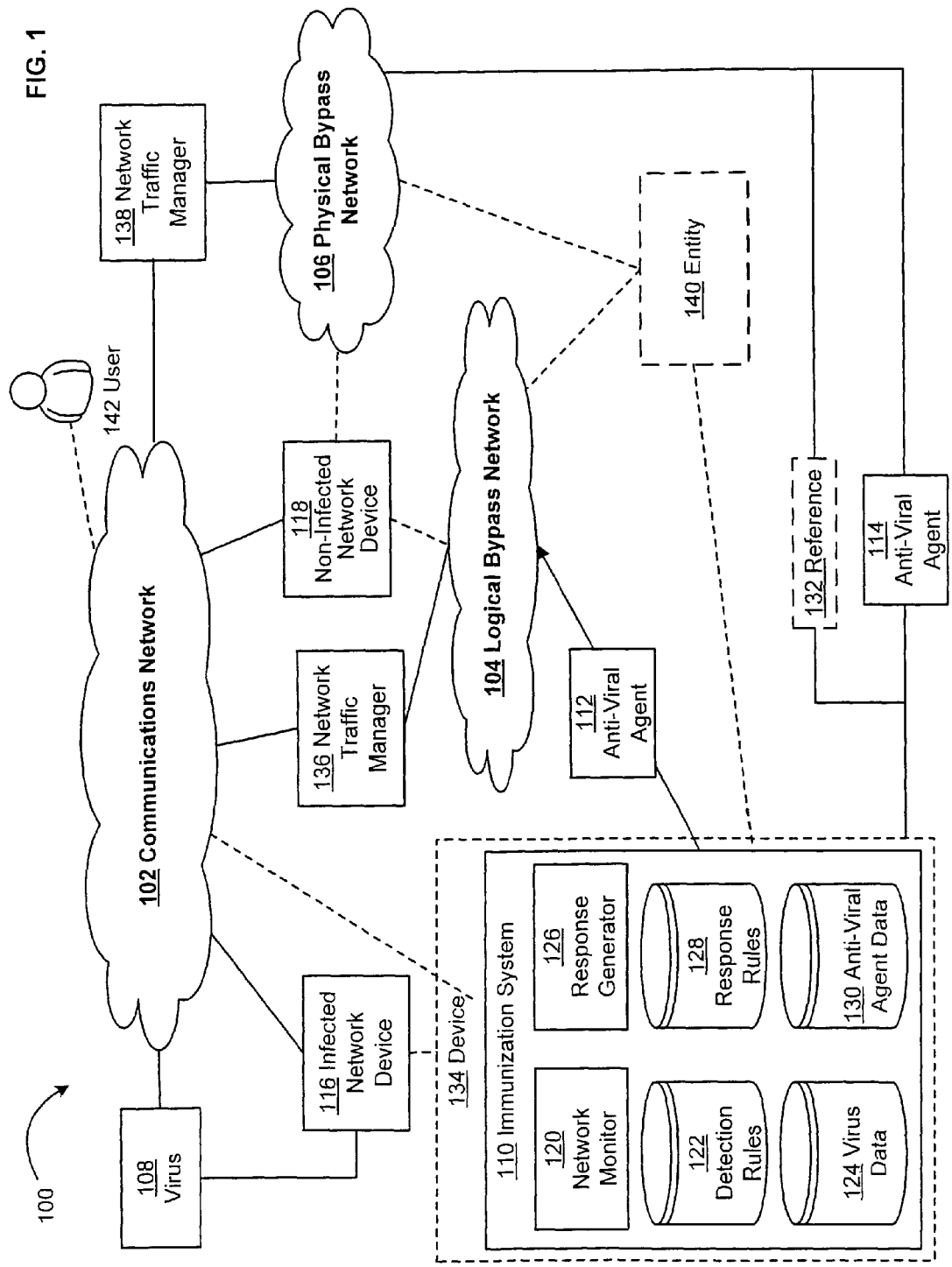
FIG. 1 illustrates an example multi-network virus immunization system in which embodiments may be implemented, perhaps in a device.

FIG. 1 illustrates an example multi-network virus immunization system 100 in which embodiments may be implemented. In the example of FIG. 1, the multi-network virus immunization system 100 is operable, for example, to prevent or reduce damage caused by malicious software code, or otherwise limit a propagation and/or replication of any undesired code or behavior within a computer network. For example, the multi-network virus immunization system 100 may be operable to limit propagation/replication of undesired code within a first network by initiating a competing and inherently-advantaged propagation/replication of desired code, using a second network.

In the example of FIG. 1, an example of such a first network is illustrated as a communications network 102. The communications network 102 may include, for example, virtually any computer network over which users and/or network devices may conduct a mutually-desirable exchange of information, where such mutually-desirable information may include and/or be referred to as communications data. For example, such communications data may include voice or e-mail traffic that is desired by both a sending and a receiving party, or may include a file transfer (including, for example, a video and/or audio file transfer) desired by both a sending and a receiving party. The communications network 102 may include, for example, a virtual local area network, a virtual private network (VPN), and/or a corporate intranet, and, in such examples, may be implemented as part of (e.g., as a subset of) a larger network, such as, for example, the public Internet. Other examples of the communications network 102 and of communications data are provided in more detail, herein.

Further in the example of FIG. 1, an example of the second network referenced above as part of the multi-network virus immunization system 100 may include a logical bypass network 104 and/or a physical bypass network 106, and/or other example(s) of a bypass network(s), as described in more detail, herein. For example, the logical bypass network 104 may include a computer network that is at least partially logically separate from the communications network 102 (e.g., at least one or more segments of the logical bypass network 104 may be logically separate from the communications network 102). For example, the communications network 102 and the logical bypass network 104 may both be implemented on an identical set (or sub-set(s)) of computing devices that are physically connected to one another, but that implement different network protocols, or that implement different instances of the same or similar network protocols, or that are implemented at different layers of a protocol stack, or are otherwise logically-separated from one another.

For instance, a computer that is common to both the communications network 102 and the logical bypass network 104 may be assigned a first Internet Protocol (IP) address on the communications network 102, and a second IP address on the logical bypass network 104. It should be understood that computers common to the communications network 102 and to the logical bypass network 104 may share a common hub or switch, or other network device(s), but may nonetheless represent logically-separate networks that are generally incapable of communicating with one another without some type of translation or mediation therebetween. For example, as discussed in more detail herein, such translation and/or mediation may occur at a router or gateway that connects the communications network 102 and the logical bypass network 104.

The physical bypass network 106 represents, for example, a network that is at least partially physically separate from the communications network 102. For example, the physical bypass network 106 may include computers or other network devices that are different physical devices than those found on the communications network 102, and/or that communicate using different (types of) transmission media and/or techniques, and/or that are configured using a physically distinct network topology. For example, where the communications network 102 may include one or more local area networks (LANs) connected together in a wired fashion (e.g., using Ethernet and/or fiber), the physical bypass network 106 may include a satellite-based network, or a cellular network, or some other physically separate network, examples of which are discussed in more detail, herein.

Of course, although the example of FIG. 1 illustrates the logical bypass network 104 and the physical bypass network 106, it should be understood that these are merely intended as non-limiting examples, and that additional or alternative examples of bypass network(s) may be used in the multi-network immunization system 100. Further, although both the logical bypass network 104 and the physical bypass network 106 are illustrated in FIG. 1, it should be clear that, in any given implementation of the multi-network immunization system 100 (such as those described herein), only one such bypass network may be used.

As referenced herein, the logical bypass network 104 and/or the physical bypass network 106 may be used to prevent or reduce a propagation/replication of undesired code or behavior on the communications network 102. In the example of FIG. 1, a virus 108 is illustrated that represents and includes any such undesired-code or behavior, including but not limited to, for example, malicious code that is created and/or distributed within the communications network 102 by a party desiring to harm or otherwise inconvenience users of the communications network 102. For example, the virus 108 may include self-replicating and/or self-propagating (and perhaps evolving) code that may infect network devices of the communications network 102, so as, for example, to destroy, modify, or create data on such network device(s). More generally, the virus 108 may represent and include virtually any code that attacks a confidentiality, integrity, availability, accountability, and/or accuracy of a device and/or transmission of the communications network 102. Even more generally, the virus 108 need not be malicious in the sense(s) just referenced, but may simply be undesired on the communications network 102 by an administrator or other user of the communications network 102. Further examples of the virus 108 are provided in more detail, herein.

An immunization system 110 is illustrated in the example of FIG. 1 that is operable to determine the virus 108 that is associated with the communications network 102. The immunization system 110 is further operable to distribute an anti-viral agent 112 and/or an anti-viral agent 114 onto the communications network 102 using a bypass network, e.g., the logical bypass network 104 and/or the physical bypass network 106. The logical bypass network 104 and/or the physical bypass network 106 is/are configured to provide transmission of the anti-viral agent 112 and/or the anti-viral agent 114 with at least one of a higher transmission speed, a higher transmission reliability, a higher transmission security, and/or a physically-separate transmission path, relative to transmission of the virus 108 on the communications network 102. In this way, the virus 108 may be prevented or limited from spreading or existing on the communications network 102.

In this regard, it should be understood that the virus 108 may replicate, exist, and/or propagate on the communications network 102 in a manner(s) that may be very fast and/or difficult to detect and/or destroy. In fact, in many cases, the virus 108 may be specifically engineered to be difficult to contain within the communications network 102. For example, the virus 108 may spread in a multi-cast or broadcast fashion, and may infect devices of the communications network 102 in a virtually exponential progression. In other examples, the virus 108 may be designed to infect devices of the communications network 102 and to takce no action on an infected network device 116 of the communications network 102, at least initially, while the virus 108 spreads to a larger number of network devices. Then, the virus 108 may execute (e.g., after some pre-designated time or signal), so that a large number of already-infected and damaged devices are determined at once. Thus, in many cases, the virus 108 may have an inherent advantage (e.g., a "head-start") in propagating on the communications network 102, particularly since, for example, a curative or mitigating response to the virus 108 often may not be developed with sufficient specificity and effectiveness until the virus 108 is sufficiently examined and analyzed.

The multi-network virus immunization system 100 thus uses a bypass network, such as the logical bypass network 104 and/or the physical bypass network 106, to provide an alternate, out-of-band, or otherwise advantageous channel and/or path for transmission of the anti-viral agent 112 (and/or the anti-viral agent 114). As described herein, one or more characteristics and/or metrics of such bypass network(s) may enable distribution of the anti-viral agent(s) 112, 114 in an advantageous manner that enhances an effectiveness thereof in preventing or limiting the virus 108 on the communications network 102.

For example, the logical bypass network 104 may provide transmission of the anti-viral agent 112 to a non-infected network device 118 of the communications network 102 with a greater transmission speed, lower latency, effective speed, and/or faster delivery time than provided by the communications network 102 in delivering the virus 108 from the infected network device 116 to the non-infected network device 118. More generally, as the virus 108 spreads through the communications network 102, the immunization system 110 may use the logical bypass network 104 to distribute the anti-viral agent 112 ahead of the spreading of the virus 108. In this way, the anti-viral agent 112 may immunize non-infected (e.g., not-yet infected) network devices of the communications network 102, including the non-infected network device 118, against the virus 108. Accordingly, the spread of the virus 108 on the communications network 102 may be slowed or stopped, as fewer and fewer network devices on the communications network 102 are available as possible hosts for the virus 108.

Similar comments apply to the physical bypass network 106 in distributing the anti-viral agent 114. Moreover, as described herein, other characteristics and/or metrics associated with the physical bypass network 106 (and/or the logical bypass network 104) may be utilized in distributing the anti-virus agent 114 (and/or the anti-viral agent 112) on the communications network 102. For example, the physical bypass network 106 may provide transmission of the anti-viral agent 114 with a greater reliability and/or greater security than is available to the communications network 102 in transmitting the communications data and/or the virus 108. Greater reliability in this sense may include, for example, greater point-to-point and/or end-to-end reliability in transmitting the anti-viral agent 114 than is available to the communications network 102. Similarly, greater security may include, for example, greater point-to-point and/or end-to-end security (e.g., encryption). By using an effectively higher reliability and/or security, the physical bypass network 106 may increase the probability or expectation that the anti-viral agent 114 may be delivered to the communications network 102 in a way that is effective in stopping or otherwise limiting the spread of the virus 108.

In some example implementations, the anti-viral agent(s) 112, 114 also may be self-replicating and/or self-propagating. Thus, once deployed onto the communications network 102, the anti-viral agents 112, 114 may spread to a plurality of non-infected devices thereof, so that such non-infected devices may be rapidly immunized against the spread of the virus 108. Due to the advantage(s) provided by the characteristics of the logical bypass network 104 and the physical bypass network 106, respectively, the anti-viral agents 112, 114 may compensate for, or overcome, any advantages experienced by the virus 108 in propagating on the communications network 102, and may therefore be effective in stopping or otherwise limiting the propagation of the virus 108.

In the example of FIG. 1, the immunization system 110 includes a network monitor 120 that is operable to determine the virus 108 on the communications network 102. For example, the network monitor 120 may detect and/or identify the virus 108, by, for example, implementing detection rules 122, and/or using known virus data 124. For example, the detection rules 122 may specify parameters for selecting and scanning network devices of the communications network 102 (e.g., which or how many network devices should be scanned, and with what frequency), and the network monitor 120 may implement these and/or other examples of the detection rules 122. The network monitor 120 also may determine the virus 108 using known virus data 124, e.g., by comparing a signature of the virus 108 with known virus signatures stored therein, according to the detection rules 122. Various other examples of the nature and operation of the network monitor 120, the detection rules 122, and the virus data 124 are provided in more detail, herein.

The immunization system 110 also includes a response generator 126 that is operable to communicate with the network monitor 120 to generate a response to the virus 108. The response generator 126 may act according to response rules 128 that may govern, for example, a creation of the anti-viral agents 112, 114 and/or a distribution of the anti-viral agents 112, 114 using the logical bypass network 104 and/or the physical bypass network 106. For example, the response generator 126 may use the response rules 128 to determine which of the logical bypass network 104 and the physical bypass network 106 to use (in a case where both are available), or where and how to inject the anti-viral agents 112, 114 onto the communications network 102. The response rules 128 also may govern a manner in which the response generator 126 uses anti-viral agent data 130 to create, distribute, or otherwise provide the anti-viral agents 112, 114. For example, the response generator 126 may select from several possible anti-viral agents and/or distribution strategies available in the anti-viral agent data 130, based on information provided by the network monitor 120 and/or based on the response rules 128.

As another example, the response generator 126 may provide the anti-viral agent 114 by first distributing a reference 132 to the anti-viral agent 114 on the communications network 102, using the physical bypass network 106. For example, the reference 132 may include a pointer, link, or other identifier of the anti-viral agent 114, so that, for example, the non-infected network device 118 may obtain or otherwise access the actual anti-viral agent 114 itself, e.g., from the anti-viral agent data 130. Various other examples of the nature and operation of the response generator 126, the response rules 128, and/or the anti-viral agent data 130 are provided in more detail, herein.

In FIG. 1, the immunization system 110 is illustrated as being implemented on a (single, generic) device 134, which may represent virtually any computing device(s) capable of executing the functions and features described herein, including, for example, a desktop computer, a workstation computer, a server, a personal digital assistant (PDA) or cell phone, a laptop computer, a tablet personal computer, a networked computer, or a computing system comprised of a cluster of processors. Further, the immunization system 110 may be implemented in whole or in part on (or in association with) the infected network device 116, the non-infected network device 118, a network traffic manager 136 associated with the communications network 102 and the logical bypass network 104, or a network traffic manager 138 between the communications network 102 and physical bypass network 106. For example, the network traffic managers 136, 138 may include router(s), gateway(s), firewall(s), or other devices for implementing network policies and/or managing network traffic.

For example, the network traffic manager 136 may represent a router that provides translation between the communications network 102 and the logical bypass network 104, and that may be present on both of the communications network 102 and the logical bypass network 104. In some such example implementations, the network traffic manager 136 may implement the network monitor 120 and the detection rules 122 to detect the virus 108 on the communications network 102, and/or may implement the response generator 126 and/or the response rules 128 to distribute the anti-viral agent 112.

For example, the network traffic manager 136 may include a tag-prioritized router (e.g., implementing Multiprotocol Label Switching (MPLS)) that is operable to recognize and prioritize network traffic that is tagged as being associated with the anti-viral agent 112. For example, the top "n" tags of network traffic may be reserved on the network traffic manager 136 as being associated with the anti-viral agent 112. In this way, for example, the anti-viral agent 112 may be provided ahead of the virus 108 on the communications network 102, even when the communications network 102 and the logical bypass network 104 share the same computing devices and/or network traffic manager(s).

Also in FIG. 1, an entity 140 is illustrated as owning, assuring, guaranteeing, providing, or otherwise sponsoring the logical bypass network 104 and/or the physical bypass network 106. Although not directly illustrated in FIG. 1, it should be understood that the entity 140, or a different entity (not shown in FIG. 1) may sponsor the communications network 102, as well. Accordingly, the entity 140 may be responsible for implementing some or all of the immunization system 110 in conjunction with one or more of the communications network 102, the logical bypass network 104, the physical bypass network 106, and/or the network traffic managers 136, 138.

For example, the entity 140 may represent one or more of a network service provider or an antiviral service provider, and/or may represent a third-party entity that billing or other services associated with defining or providing the communications network 102 on behalf of a network service provider (e.g., may provide the communications network 102 as a virtual private network (VPN) having defined or desired characteristics or users, in exchange for a fee(s)). As such, (access to) one or more of the communications network 102, the logical bypass network 104, and/or the physical bypass network 106, may be provided in conjunction with a service level agreement (SLA) between the entity and a recipient/user of one or more of the communications network 102, the logical bypass network 104, and/or the physical bypass network 106. Thus, one or more of the communications network 102, the logical bypass network 104, and/or the physical bypass network 106 may be considered to be a managed network, e.g., managed by the entity 140. As such, one or more of the communications network 102, the logical bypass network 104, and/or the physical bypass network 106 may be operated essentially independently-of one another and/or using separate/distinct management consoles.

Thus, as should be understood from the description provided herein, a user 142 may be provided with (or provided with access to) one or more of the communications network 102, the logical bypass network 104, and/or the physical bypass network 106. The user 142 may include, for example, a single consumer, employee, service provider, or other person(s), or may represent a corporation or other entity (e.g., a corporation providing the communications network 102 to employees as part of a corporate intranet).

Accordingly, the user 142 may obtain the benefit(s) of one or more of the communications network 102, the logical bypass network 104, and/or the physical bypass network 106, in exchange for payment provided to the entity 140. In this context, payment may refer generally to any type of monetary compensation, and/or non-monetary compensation, and/or economic value exchange. By way of example and not limitation, a payment may include a non-monetary payment, including a reduced or eliminated cost to the user 142, in exchange for a granting of certain rights or permissions to the entity 140 (such as, for example, granting the entity 140 rights to certain information of the user 142, including personal information of the user 142 for maintaining in a database for marketing or research purposes).

Figure 2:
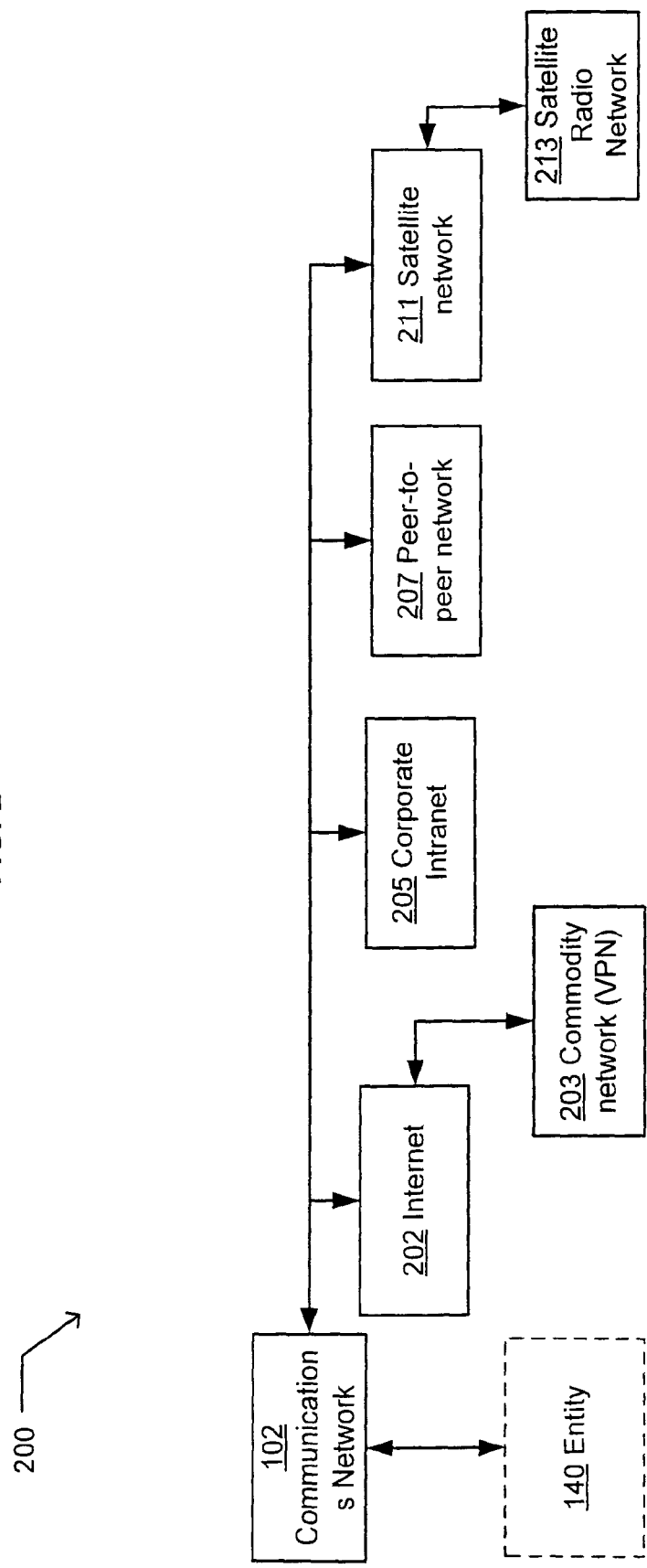
FIG. 2 illustrates example embodiments of a communications network of the multi-network virus immunization system of FIG. 1.

FIG. 2 illustrates example embodiments of the communications network 102 of the multi-network virus immunization system 110 of FIG. 1. In FIG. 2, the comrrnunications network 102 is illustrated as potentially including one or more of the public internet 202, a subset of the public internet 202 such as a commodity network 203 (e.g., a VPN), a corporate intranet 207, a peer-to-peer network 207, a satellite network 211, or a specific type of the satellite network 211 such as a satellite radio network 213. Of course, the examples in FIG. 2 are non-limiting examples of the communications network 102, and many other examples and implementations may be used. As should be understood from the description provided herein, the entity 140 may be associated with providing, or providing access to, one or more of the example networks 202-212 illustrated in FIG. 2.

Figure 3:
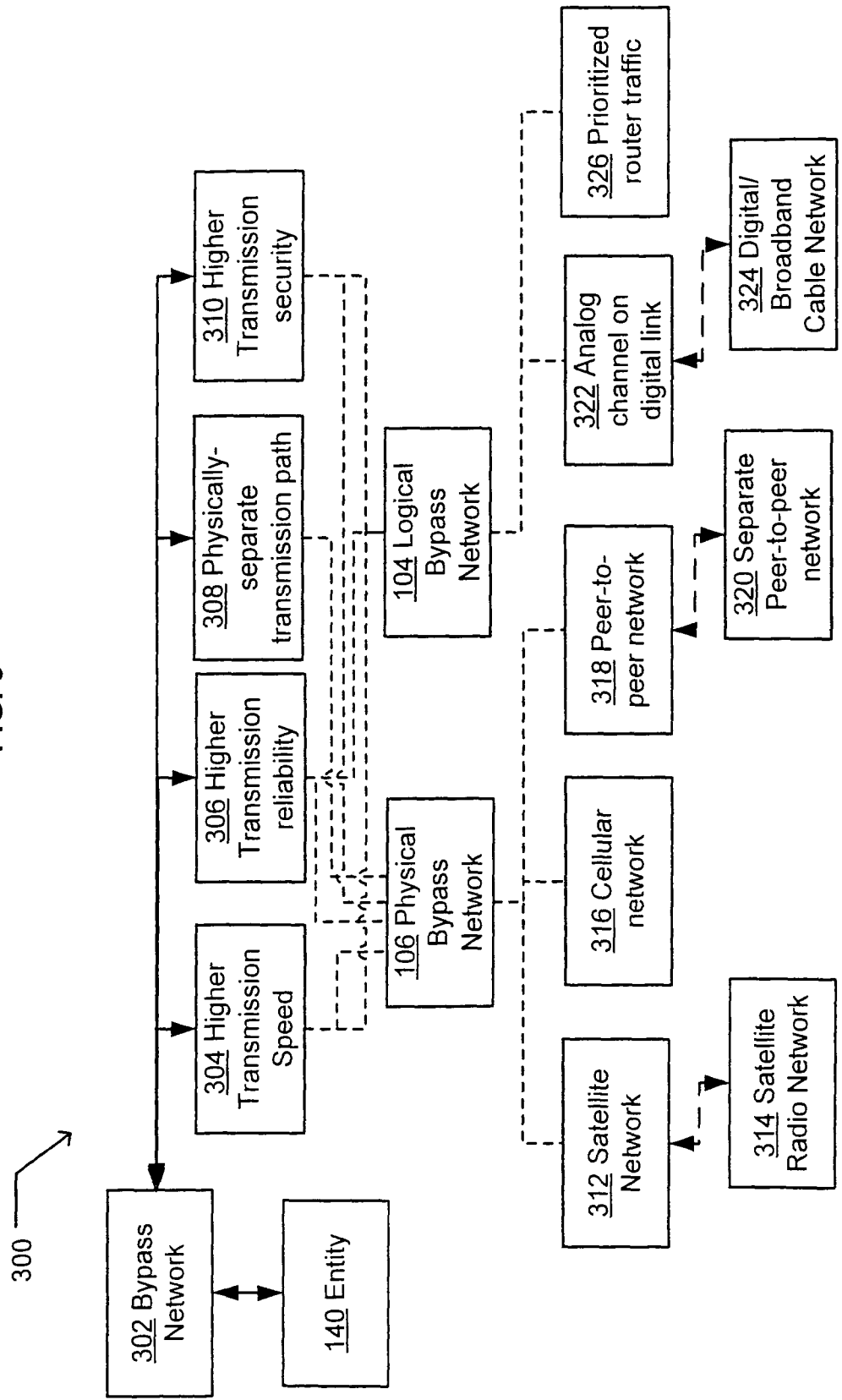
FIG. 3 illustrates example embodiments of bypass network(s) of the multi-network virus immunization system of FIG. 1.

FIG. 3 illustrates example embodiments of the bypass network(s) 104, 106 of the multi-network virus immunization system of FIG. 1. FIG. 3 illustrates a bypass network 302 that should be understood to represent or include one or both of the logical bypass network 104 and/or the physical bypass network 106, and/or another bypass network(s). As shown and described in more detail herein, the bypass network 302 may be configured to provide one or more of a higher transmission speed 304, a higher transmission reliability 306, and/or a physically-separate transmission path 308, and a higher transmission security 310 relative to transmission of the virus 108 on the communications network 102.

In so doing, and as just referenced, the bypass network 302 may use the physical bypass network 106 and/or the logical bypass network 104. In FIG. 3, examples of the physical bypass network 106 are illustrated as including one or more of a satellite network 312 (including, potentially, a satellite radio network 314), a cellular network 316, or a peer-to-peer network 318 (including, potentially, a separate peer-to-peer network 320 that may be provided in conjunction with, but separately or independently from, the communications network 102, e.g., the peer-to-peer network 208).

Further in FIG. 3, the logical bypass network 104 is illustrated as including an analog channel on a digital link 322, including, for example, an analog channel on a digitalibroadband cable network 324. The logical bypass network 104 also may include prioritized router traffic 326, such as, for example, the prioritized router traffic described herein with respect to the network traffic manager 136.

The entity 140 is illustrated in FIG. 3 as sponsoring or otherwise providing (or providing access to) the bypass network 302. Of course, it should be understood that the entity 140 may represent one or more entities, and that a different entity may sponsor or provide the communications network 102 than the entity that provides the bypass network 302.

Further in FIG. 3, the networks 104, 106, and 304-324 are illustrated with dashed lines to illustrate examples of how the bypass network 302 may be provided. Of course, again, the illustrated connections are merely illustrative, and are not limiting as to how the bypass network(s) may be connected, inter-connected, or otherwise provided.

Figure 4:
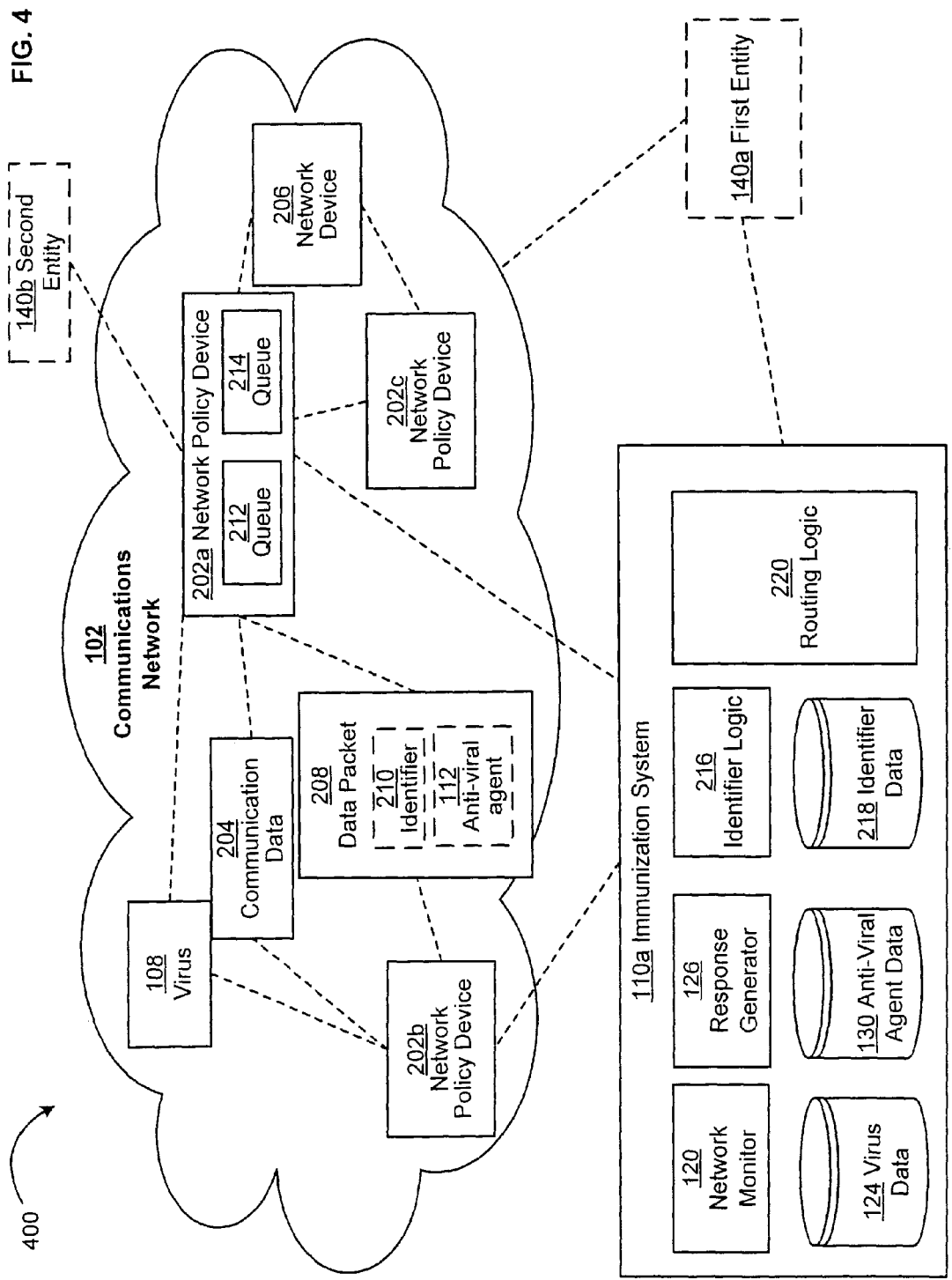
FIG. 4 illustrates an example immunization system for providing virus immunization using prioritized routing.

FIG. 4 illustrates an example immunization system 110a for providing virus. immunization using prioritized routing. As referenced herein, example techniques for implementing a bypass network for providing the anti-viral agent 112 include using prioritized routing to provide the anti-viral agent 112 to the communications network 102 for the purpose of, e.g., countering a spread or effect of the virus 108. In this regard, as referenced herein, the use of such prioritized routing may be considered to provide an example of use of the logical bypass network 104. For example, prioritized network traffic associated with the anti-viral agent 112 may be considered to be communicated over a separate logical network (e.g., the logical bypass network 104) than the communications network 102. However, in other examples, it should be understood that prioritized routing may be provided using at least some devices that are not part of the same physical network as the communications network 102, so that it should be understood, for example, that the prioritized routing associated with the anti-viral agent 112 may be implemented at least in part using the physical bypass network 106, as well.

In FIG. 4, at least a network policy device 202*a*, a network policy device 202*b*, and a network policy device 202*c* are associated with providing prioritized routing associated with the anti-viral agent 112. For example, the network policy devices 202*a*, 202*b*, and 202*c* may be configured to transmit the anti-viral agent 112 over the comnmunications network 102 in a prioritized fashion, relative to communication data 204 of the communications network 102.

In this regard, the communication data 204 may be considered to represent, by way of example and not limitation, virtually any data that is desired to be transmitted over the communications network 102 by a user(s) or administrator(s) thereof. Thus, the communication data 204 may include, for example, e-mails, text files, audio/video files, program files, or voice transmissions. The communication data 204 also may be associated with some subset of the communication network 102, such as, for example, a VPN and/or corporate intranet.

The network policy devices 202*a*, 202*b*, and 202*c* may represent, or may be a type of, for example, the network traffic manager 138 of FIG. 1. With reference specifically to the network policy device 202*a*, for example, various types of prioritized routing may be implemented. In this regard, it should be understood that the term routing in this context may include virtually any designation, forwarding, switching, converting, translating, or otherwise transmitting of network data over/through the communications network 102, and/or other network (e.g., the logical bypass network 104). For example, then, the network policy device 202*a* may include or communicate with one or more of a router, a bridge, a network switch, a software-based switch, a hardware-based switch, a gateway, a hub, a converter, a repeater, a proxy, a server, and/or a firewall.

As described herein, one potential use of the network policy devices 202*a*, 202*b*, and 202*c* is to immunize or otherwise protect a network device 206 of the communications network 102. For.example, the virus 108 may be (imminently) present on, or spreading through, the communications network 102, perhaps in conjunction with the communication data 204, as described herein. In response, the immunization system 110*a*, which may be implemented on one or more of the network policy devices 202*a*, 202*b*, 202*c* (and/or on other devices), may cause at least one of the network policy devices 202*a*, 202*b*, 202*c* to route the anti-viral agent 112 to the network device 206, e.g., ahead of a propagation of the virus 108, even when the virus 108 is being transmitted through/by one or more of the same network policy devices 202*a*, 202*b*, 202*c*. In this way, for example, the anti-viral agent 112 may reach the network device 206 in time to immunize the network device 206 against the virus 108 in a straight-forward and effective manner.

Various examples of techniques by which the imrmnunization system 110*a* and/or the network policy devices 202*a*, 202*b*, 202*c* may provide such immunization are described herein. Of course, many additional or alternative techniques also may be implemented.

In some example implementations, the anti-viral agent 112 may be included within a data packet 208, where the data packet 208 may contain routing information, e.g., in a header of the data packet 208, that allows the anti-viral agent 112 to be routed in a preferred or prioritized manner, relative either to the virus 108 and/or to the communication data 204. For example, the data packet 208 may include an identifier 210 that is recognizable by the immunization system 110*a* and associated with prioritized routing of the data packet 208. For example, the identifier 210 may include a tag or label, so that one or more of the network policy devices 202*a*, 202*b*, 202*c* may implement label-switched routing of the data packet 208.

Label-switched routing, which also may be referred to as label-switching or similar terms, allows the network policy devices 202*a*, 202*b*, 202*c* to avoid network-layer routing of the data packet 208 (e.g., to avoid routing the data packet 208 based on a network layer address of the data packet 208). As such, the network policy devices 202*a*, 202*b*, 202*c* may be considered to be part of a separate system or network (e.g., the logical bypass network 104 of FIG. 1) that may be referenced as a label-switched network. The network policy devices 202*a*, 202*b*, 202*c* may route the data packet 208 based on its associated label, e.g., the identifier 210, so as to provide, for example, an end-to-end connection between an ingress point to the label-switched network and an egress point, e.g., the network device 206, or an end-to-end connection across a plurality of label-switched networks.

One example of such label-switching, as referenced above, is known as Multi-Protocol Label Switching (MPLS). MPLS allows label switching across various network protocols, such as, for example, Open Shortest Path First (OSPF) protocol, Routing Information Protocol (RIP), or Border Gateway Protocol (BGP). MPLS may be implemented at or in association with layer 2 (the data link layer), using, e.g., X.25, Frame Relay, or ATM. MPLS also may be implemented at or in association with layer 3 (the network layer), using, e.g., the Internet Protocol (IP). As such, MPLS may be considered to operate between layers 2 and 3.

In the example of MPLS, the data packet 208 and/or the identifier 210 may be assigned a higher transmission class, e.g., Forwarding Equivalence Class (FEC), than most or all of the communication data 204 and/or the virus 108, and may therefore benefit from prioritized forwarding by, for example, the network policy device 202*a*. In some examples, such preferred forwarding may be accomplished through the use of queue scheduling priority, using an example queue 212 and queue 214. In other words, for example, the queue 212 may be associated with the identifier 210 and similar identifiers, and may be configured to prioritize the data packet 208 and other data packets associated with the anti-viral agent(s) 112 ahead of all other classes of traffic, which may be forwarded through the queue(s) 214. Although the queues 212 and 214 are illustrated as separate queues, it should be understood that the network policy device 202a may include one or more queues or buffers, as needed, and that prioritization of the data packet 204 may occur within a given queue by prioritized or preferred placement of the data packet 208 within the given queue (e.g., reserving the top "n" labels or tags within the network policy device 202a for the anti-viral agent 112), and/or by prioritized advancement of the data packet 208 through the given queue or buffer, and/or by a preference toward discarding packets associated with the communication data 204 when the data packet 208 is present.

As additional or alternative examples, queuing techniques may involve, for example, suppressing a transmission of the communication data 204 from within the queue 214 whenever the data packet 208 (or other packet having the identifier 210) is present within the queue 212. In other example implementations, it may be the case that greater network/computing resources (e.g., memory, processing power, and/or bandwidth) are devoted to contents of the queue 212. In additional or alternative examples, it may be the case that the data packet 208 is routed through the network policy device 202a faster than the communication data 204 by virtue of the fact that the data packet 208 is label-switched, while the communication data 204 may be routed at a network layer. As yet another example, it may be the case that the network policy device 202a, and/or the immunization system 110a, may route the anti-viral agent 112 through a shorter and/or less-congested network path than the communication data 204 (e.g., represented in FIG. 4 by, respectively, the single dashed line connecting the network policy device 202a with the network device 206, as compared to the multiple dashed lines connecting the network policy device 202a to the network device 206 through the intermediate network policy device 202c).

As further examples of how the network policy devices 202a, 202b, 202c and/or the immunization system 110a may prioritize transmission of the anti-viral agent 112 relative to the communication data 204 and/or the virus 108, a policy of Differentiated Services (DiffServ) may be implemented.

DiffServ generally seeks to provide, along with some level of assurance, a minimum level of quality of service (QoS) for certain types of network data. For example, data packets from a specified source, or having a specified characteristic, may be provided with a higher quality of service than other data packets (e.g., highest priority may be given to a packet(s) with a highest value specified in a type of service field).

Often, a negotiation may be made by an entity for guaranteed QoS for a large data flow associated therewith. Contracts setting forth, for example, a level of payment required in exchange for a particular level of QoS for a particular type/amount of data forwarding may be negotiated between parties, and such contracts, as referenced herein, may be referred to or known as Service Level Agreements (SLA).

For example, a business entity, such as a first entity 140a, may make an agreement with a second entity 140b. Here, the first entity 140a and the second entity 140b may represent one or more of the examples provided above with respect to the entity 140 of FIG. 1, and/or with respect to the user 142 of FIG. 1. In some examples, the first entity 140a may represent a network provider, or network service provider, while the second entity 140b may represent an anti-viral service provider. For example, the first entity 140a may represent a network provider that is responsible for providing some or all of a physical infrastructure of the communications network 102, and/or that is responsible for providing general network services for the communication data 204. Meanwhile, the second entity 140b may represent an anti-viral service provider that is in the business of protecting, e.g., consumers or other entities or users from the virus 108.

Thus, various combinations and implementations are possible for how the first entity 140a and the second entity 140b may interact or negotiate with one another. For example, the first entity 140a, as a network provider, may offer DiffServ to the second entity 140b, as an anti-viral service provider. The first entity 140a may own and/or operate one or more of the network policy devices 202a, 202b, 202c, as well as some or all of the immunization system 110a. Meanwhile, the second entity 140b may wish to have access to, or use of, one or more of the network policy devices 202a, 202b, 202c, and/or the immunization system 110a, or may itself own/operate one or more of the network policy devices 202a, 202b, 202c, and/or the immunization system 110a. For example, the second entity 140b may implement the anti-viral agent 112, and may wish to have QoS guarantees from the first entity 140a for transmission thereof.

Accordingly, a SLA may be negotiated between the first entity 140a and the second entity 140b, to that effect. The SLA may specify, for example, the anti-viral agent 112 to varying levels of specificity, the identifier 210, a level of guarantee that is required, and how much data the second entity 140b expects (or the first entity 140a allows) to be provided with prioritized routing.

Thus, it may be seen that the network policy devices 202a, 202b, 202c, as well as some or all of the immunization system 110a, may be used to provide separate transmission channels within, through, and among the network policy devices 202a, 202b, 202c for the anti-viral agent 112 as compared to the communication data 204 and/or the virus 108. In so doing, it should be understood that the immunization system 110a may be implemented at one or more of the network policy devices 202a, 202b, 202c, and/or at the network device 206, or on a stand-alone device (e.g., the device 134 of FIG. 1).

The immunization system 110a may operate similarly to the immunization system 110 of FIG. 1, but the example of FIG. 4 is shown as being implemented within the context of immunization through prioritized routing. Thus, it should be understood that discussion herein of the immunization system 110 and associated components may generally apply to the immunization system 110a, except to the extent that such discussion is inconsistent. Accordingly, detailed discussion of common components is not provided here, and not all components of the immunization 110 of FIG. 1 are necessarily illustrated in the example of FIG. 4.

Rather, it may be understood that the immunization system 110a includes the network monitor 120 that is configured to determine a (potential) presence of the virus 108, perhaps based on the virus data 124. The response generator 126 is configured to generate a response to the virus 108, e.g., the anti-viral agent 112, perhaps based on the anti-viral agent data 130.

Identifier logic 216 is configured to generate, add, remove, or otherwise associate (or disassociate) the identifier 210 with/to the anti-viral agent 112, perhaps within the data packet 208, as described herein. Of course, it should be understood that the identifier 210 need not necessarily be included with the anti-viral agent 112 within the data packet 208. For example, the identifier 210 may include a reference or pointer to the anti-viral agent 112, and may be routed to the network device 206 for the purpose of providing the network device with access to the anti-viral agent (e.g., by providing a URL associated with the anti-viral agent).

Further, it should be understood that although a single identifier is shown, it may be the case that a plurality of identifiers are used, together or separately. For example, the identifier logic may remove a first instance of the identifier 210 and add a second instance of the identifier 210, e.g., when the data packet 208 crosses from a first label-switched network to a second label-switched network, or simply within the network policy device 202a.

The identifier logic 216 may determine whether and how to use the identifier 210, for example, based on identifier data 218, which may contain information about possible identifiers that may, should, or must be used in association with the anti-viral agent 112. For example, the identifier logic 216 may determine from the response generator 126 that the virus 108 is particularly malicious, and so may assign a highest-possible priority to the anti-viral agent 112. As another example, the identifier logic 216 may determine that the virus 108 and/or the anti-viral agent 112 is associated with the second entity 140b (e.g., an anti-viral service provider), and may consult an SLA associated with the second entity 140b to determine whether and/or how to provide the identifier 210.

Routing logic 220 may generally be responsible for routing the identifier 210 and/or the data packet 208. That is, the routing logic 220 may, for example, create or update routing tables and forward network traffic accordingly. The routing logic 220 may be considered to be separate from, overlapping with, or a part of any conventional routing that may be performed by the network policy devices 202a, 202b, 202c.

Thus, in some example implementations, it may be seen that a device, e.g., the device 134 and/or the network policy devices 202a, 202b, 202c, may include a multi-network virus immunization system (e.g., the immunization system 110), where the multi-network virus immunization system may include the network monitor 120 that may be operable to determine the virus 108 associated with the communication data 204 on the communications network 102, the communications network 102 associated with at least one network policy device (e.g., one or more of the network policy devices 202a, 202b, 202c). The multi-network immunization system also may include the identifier logic 216 that may be operable to associate the anti-viral agent 112 with the (at least one) identifier 210, and the routing logic 220 that may be operable to prioritize transmission of the at least one identifier 210 through the at least one network policy device (e.g., one or more of the network policy devices 202a, 202b, 202c), relative to the communication data 204, and further operable to provide the anti-viral agent 112 on the communications network 102. Although not specifically illustrated in FIG. 4, it should be understood, e.g., from the above description of FIG. 1, that the network monitor 120 may be operable to implement the detection rules 122 for detecting the virus 108 on the communications network 102. The (at least one) device having the multi-network immunization system 110 also may include the response generator 126 that may be operable to implement the response rules 128 that are associated with determining the anti-viral agent 112. The identifier logic 216 may be operable to select the at least one identifier 210, for example, based on one or more of identifier data 218, the anti-viral agent 112, and/or a service level agreement associated with an entity (e.g., the second entity 140b). Further, the routing logic may be operable to perform priority queue scheduling of the at least one identifier 210, e.g., using one or more of the queue 212 and/or the queue 214.

In other example implementations, at least one network policy device (e.g., one or more of the network policy devices 202a, 202b, 202c, and/or other network policy devices) may include a multi-network virus immunization system, such as the immunization system 110a, where the multi-network virus immunization system may include the identifier logic 216 that may be operable to receive information associated with the virus at the network policy device, the virus 108 being associated with the communication data 204 on t he communications network 102, and the identifier logic 216 may be further operable to associate the (at least one) identifier 210 with the anti-viral agent 112. The multi-network immunization system also may include the router logic that may be operable to prioritize transmission of the at least one identifier 210 through the at least one network policy device, relative to the communication data 204, and that may be further operable to output the at least one identifier 210 from the at least one network policy device, for provision of the anti-viral agent 112 on the communications network 102, based thereon.

In these example implementations, the multi-network immunization system may include the network monitor 120 that may be operable to implement the detection rules 122 for detecting the virus 108 on the communications network 102, and that may be further operable to provide the information associated with the virus 108 to the identifier logic 216. Further, the response generator 126 may be operable to determine the anti-viral agent in response to the information associated with the virus 108. The identifier logic 216 may be operable to associate the at least one identifier 210 based on a service level agreement associated with an entity, e.g., the second entity 140b. The routing logic 220 may be operable to route the at least one identifier 210 on a separate transmission channel than the communication data 204, as described herein.

Figure 5:
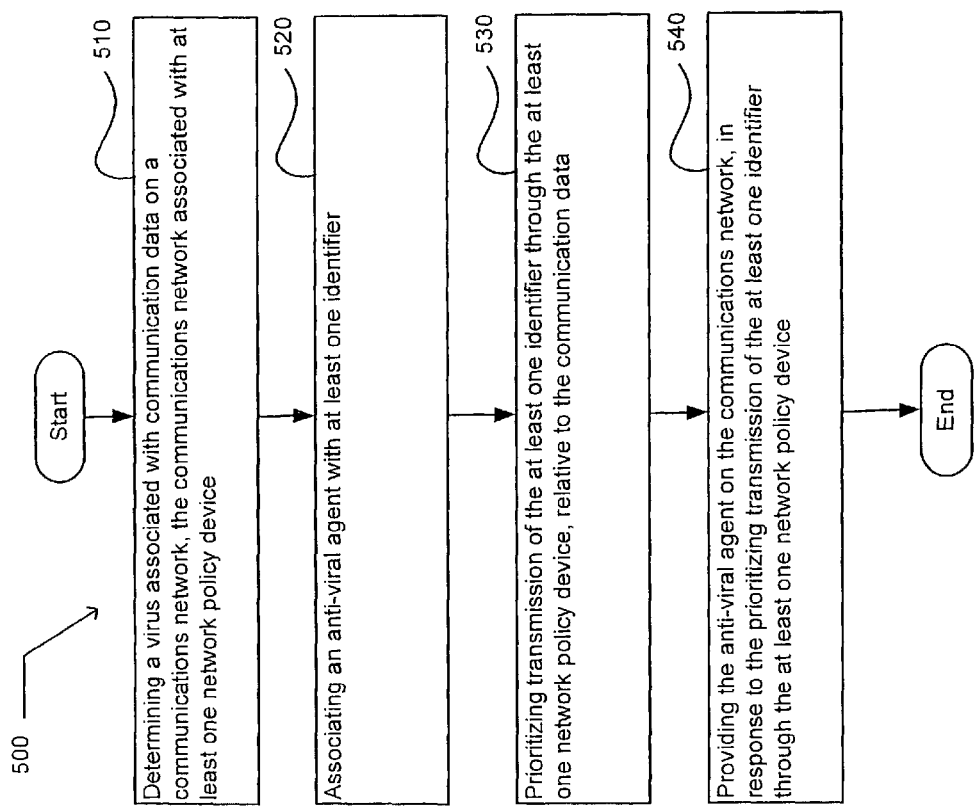
FIG. 5 illustrates an operational flow representing example operations related to techniques for virus immunization using prioritized routing.

FIG. 5 illustrates an operational flow representing example operations related to techniques for virus immunization using prioritized routing. In FIG. 5 and in following figures that include various examples of operational flows, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. Also, although the various operational flows are presented in the sequence(s) illustrated, it should be understood that the various operations may be performed in other orders than those which are illustrated, or may be performed concurrently.

After a start operation, the operational flow 500 moves to a determining operation 510 in which a virus associated with communication data on a communications network may be determined, the communications network associated with at least one network policy device. For example, the immunization system 110a, perhaps using the network monitor 120, may determine the virus 108 that may be associated with the communication data 204 on the communications network 102, which may include the network policy devices 202a, 202b, 202c, as shown in FIG. 4.

Then, in an associating operation 520, an anti-viral agent may be associated with at least one identifier. For example, the immunization system 110a may associate the anti-viral agent 112 with the identifier 210. For example, the response generator 126 may generate the anti-viral agent 112, based on an output of the network monitor 120, and the identifier logic 216 may associate the anti-viral agent 112 with the identifier 210, which may be selected based on a number of factors, such as, for example, the type of the anti-viral agent 112, or based on a service level agreement with the second entity 140b.

Then, in a prioritizing operation 530, transmission of the at least one identifier may be prioritized through the at least one network policy device, relative to the communication data. For example, the routing logic 220 may be implemented, at least in part, within the network policy device 202a, which may receive/route the communication data 204, the virus 108, and the identifier 210 (perhaps within the data packet 208). In so doing, the routing logic 220 may cause the network policy device 202a to prioritize the transmission of the identifier 210 (e.g., to transmit the identifier 210 with a higher quality of service, or with prioritized queue scheduling).

In a providing operation 540, the anti-viral agent may be provided on the communications network, in response to the prioritizing transmission of the at least one identifier through the at least one network policy device. For examnple, the immunization system 110a, e.g., the routing logic 220, may provide the anti-viral agent 112 to the network device 206, which, as described herein, may represent an as-yet uninfected device with respect to the virus 108. In this way, the network device 206, and similar devices, may be protected from the virus 108, even, for example, if the virus 108 is already propagating on the communications network 102 prior to the creation and/or distribution of the anti-viral agent 112.

As a result of the operations 510-540, operation(s) may be performed that are related either to a local or remote storage of digital data, or to another type of transmission of digital data. As discussed herein, in addition to accessing, querying, recalling, or otherwise determining or using the digital data for the operations 510-540, operations may be performed related to storing, assigning, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 6:
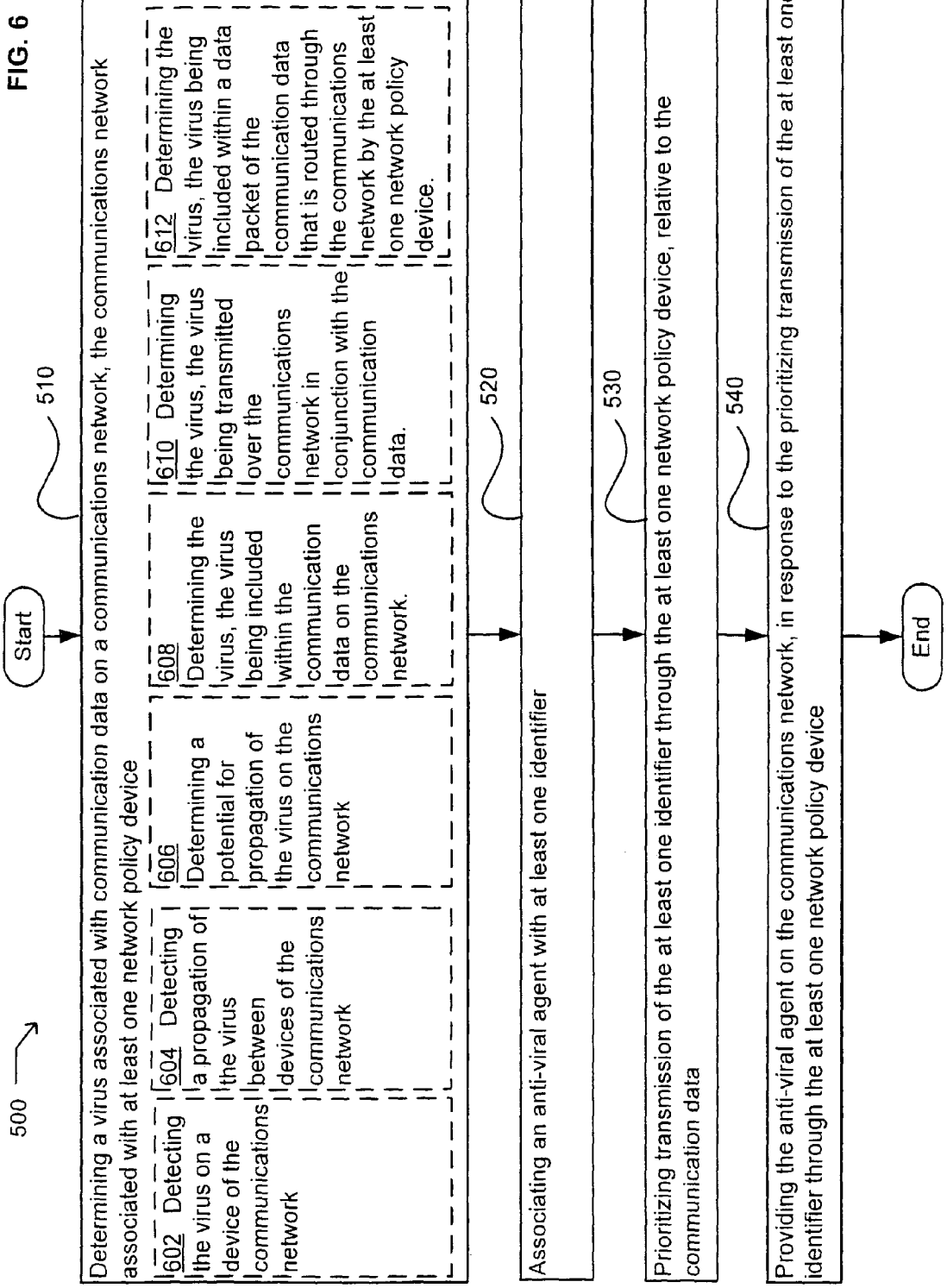
FIG. 6 illustrates an alternative embodiment of the example operational flow of FIG. 5.

FIG. 6 illustrates alternative embodiments of the example operational flow 500 of FIG. 5. FIG. 6 illustrates example embodiments where the determining operation 510 may include at least one additional operation. Additional operations may include an operation 602, an operation 604, an operation 606, an operation 608, an operation 610, and/or an operation 612.

At the operation 602, the virus may be detected on a device of the communications network. For example, the virus 108 may be sent as, or in association with, an e-mail. Then, for example, the network monitor 120 of the immunization system 110a may detect the virus 108, e.g., by examining the virus 108 (or a header, payload, and/or signature thereof).

At the operation 604, a propagation of the virus may be detected between devices of the communications network. For example, the virus 108 may, for example, propagate using the communications network 102 to (attempt to) reach non-infected network device 118 from another (e.g., infected) network device. During such propagation, which may occur, for example, over the network policy devices 202a, 202b, 202c, the network monitor 120 of the immunization system 110a may detect the virus 108.

At the operation 606, a potential for propagation of the virus on the communications network may be determined. For example, the virus 108 may be known to infect communications networks with a particular security shortcoming or loophole. Thus, in a case where the communications network 102 is associated with the security shortcoming/loophole, it may be determined that the communications network 102 is susceptible to the virus 108, e.g., that there may be a potential for propagation of the virus 108 on the communications network 102.

At the operation 608, the virus may be determined, the virus being included within the communication data on the communications network. For example, the virus 108 may be included within the communication data 204, such as when the virus 108 is included within e-mail traffic of the communications network 102.

At the operation 610, the virus may be determined, the virus being transmitted over the communications network in conjunction with the communication data. For example, the virus 108 may be transmitted separately from any authorized communications data 204.

At the operation 612, the virus may be determined, the virus being included within a data packet of the communication data that is routed through the communications network by the at least one network policy device. For example, the communications network may include a packet-based network, e.g., the public Internet (or a subset thereof) or other Internet Protocol (IP)-based network(s). In such cases, the virus 108 may be contained within associated data packets thereof.

Figure 7:
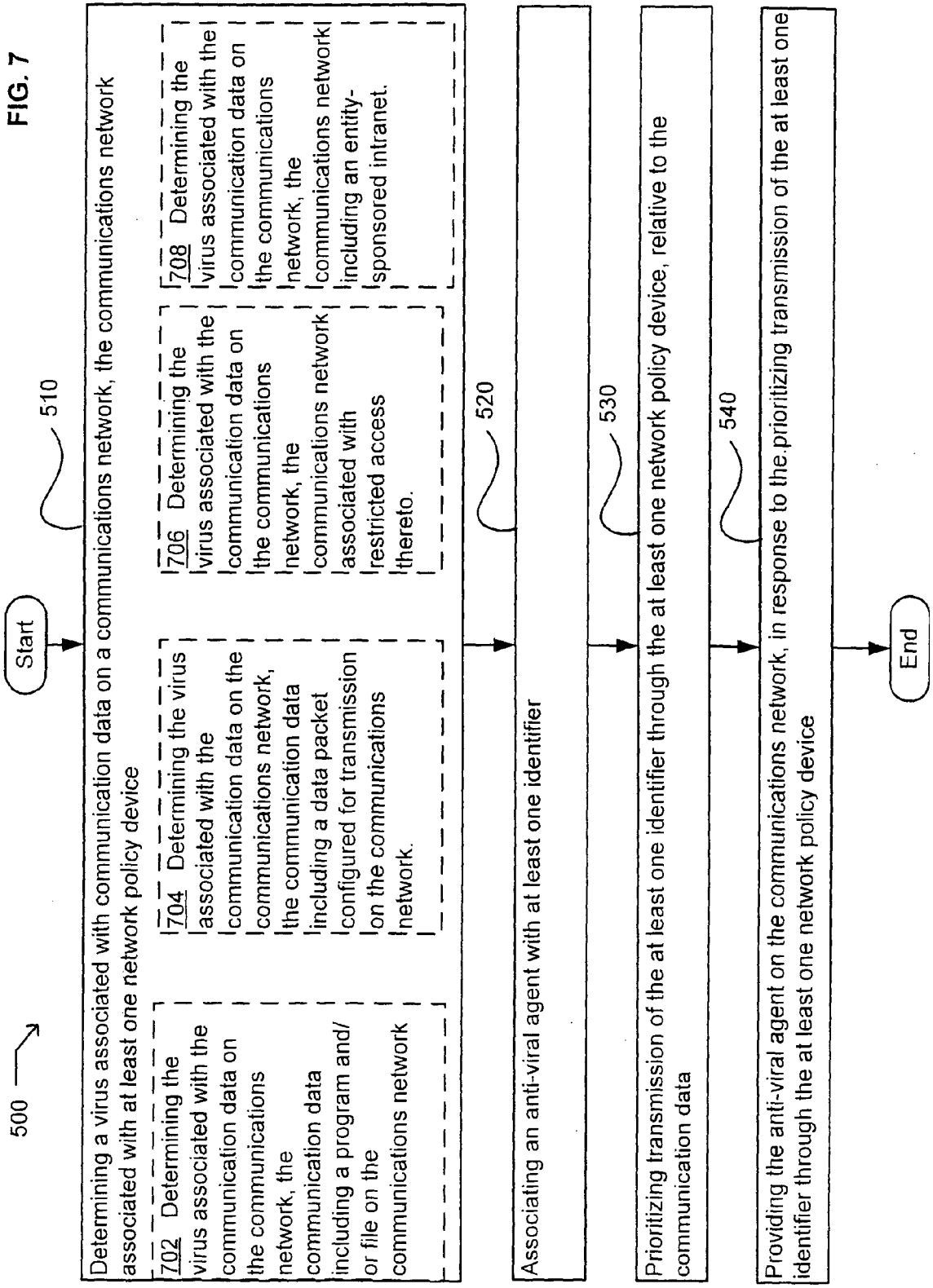
FIG. 7 illustrates an alternative embodiment of the example operational flow of FIG. 5.

FIG. 7 illustrates alternative embodiments of the example operational flow 500 of FIG. 5. FIG. 7 illustrates example embodiments where the determining operation 510 may include at least one additional operation. Additional operations may include an operation 702, an operation 704, an operation 706, and/or an operation 708.

At the operation 702, the virus associated with the communication data on the communications network may be determined, the communication data including a program and/or file on the communications network. For example, the communication data 204 may include an e-mail and associated attachment, a word processing document, a spreadsheet, a multimedia file, an executable or script, or virtually any other program or file.

At the operation 704, the virus associated with the communication data on the communications network may be determined, the communication data including a data packet configured for transmission on the communications network. For example, the communication data 204, as referenced herein, may be part of a packet-based network, so that the communication data 204 may include corresponding data packets.

At the operation 706, the virus associated with the communication data on the communications network may be determined, the communications network associated with restricted access thereto. For example, the communications network 102 may be a corporate intranet, wherein only users (e.g., the user 142 of FIG. 1) having an appropriate login and/or password may have access thereto. In these and similar examples, one or more of the entities 140, 140a, 140b may be responsible for providing the authorized access to the communications network 102. In other examples, the user 142 may represent a customer of the entity 140, and may take more direct responsibility for restricting access to the communications network. In similar examples, the communications network 102 may provide network services to the user(s) 142, who may pay a monthly fee for such network services. As in the examples just referenced, the entity 140 may be responsible for collecting the fee(s) and/or restricting the access of users who do not pay the fees.

At the operation 708, the virus associated with the communication data on the communications network may be determined, the communications network including an entity-sponsored intranet. For example, as just referenced, the communications network 102 may include an intranet of a corporation, provided for the use of employees or vendors thereof. For example, sponsorship may refer to actual provision of the communications network 102, or features thereof, as well as to the assurance of certain aspects of the communications network 102. As an example of the latter, the entity 140 may assure the user 142 of FIG. 1 of the communications network 102 that viruses, such as the virus 108, will be limited from propagation on the communications network 102. The user 142 may thus be provided with greater reliance on, and enjoyment of, the communications network 102.

Figure 8:
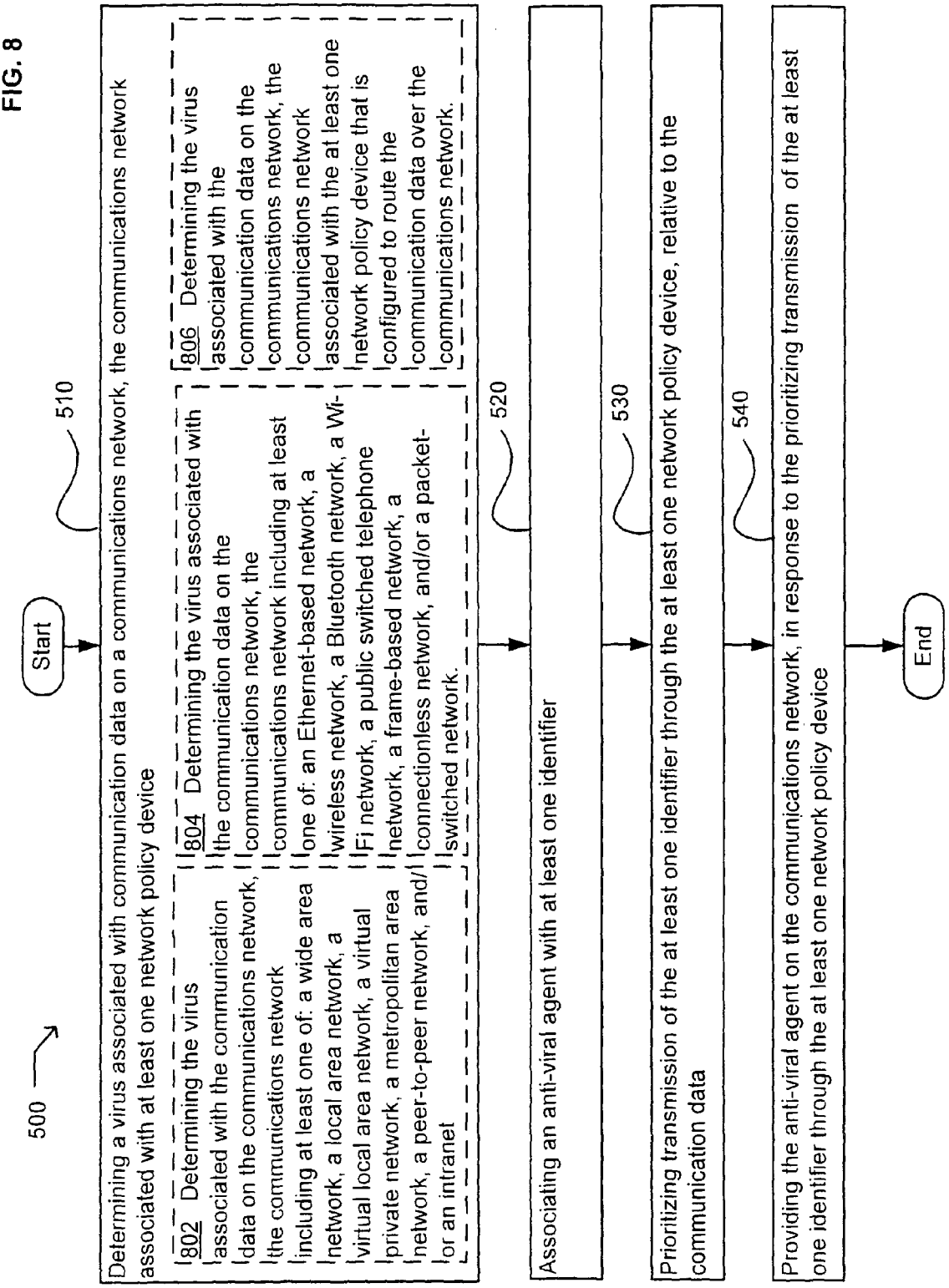
FIG. 8 illustrates an alternative embodiment of the example operational flow of FIG. 5.

FIG. 8 illustrates alternative embodiments of the example operational flow 500 of FIG. 5. FIG. 8 illustrates example embodiments where the determining operation 510 may include at least one additional operation. Additional operations may include an operation 802, an operation 804, and/or an operation 806.

At the operation 802, the virus associated with the communication data on the communications network may be determined, the communications network including at least one of: a wide area network, a local area network, a virtual local area network, a virtual private network, a metropolitan area network, a peer-to-peer network, and/or an intranet. Such examples of the communications network 102, and other examples, may be understood from FIG. 2 and the associated description provided herein, e.g., with reference to the networks 202-212. For example, a corporation, as the user 142, may pay the entity 140 of FIG. 1 to provide a plurality of local area networks (and/or virtual local area networks) that are interconnected by a wide area network, with associated uplinks and connections that allow the corporation, which may be widely dispersed geographically, to nonetheless maintain the communications network 102 as a secure, private, convenient, and cost-effective resource for the corporation's employees and/or vendors.

At the operation 804, the virus associated with the communication data on the communications network may be determined, the communications network including at least one of: an Ethernet-based network, a wireless network, a Bluetooth network, a Wi-Fi network, a public switched telephone network, a frame-based network, a connectionless network, and/or a packet-switched network. For example, as referenced herein, the communications network 102 may include a corporate intranet that is provided as a wireless network across a campus(es) of the corporation.

At the operation 806, the virus associated with the communication data on the communications network may be determined, the communications network associated with the at least one network policy device that may be configured to route the communication data over the communications network. For example, the network policy device 202a may implement one or more routing protocols, such as, for example, Open Shortest Path First (OSPF) protocol, Routing Information Protocol (RIP), or Border Gateway Protocol (BGP).

Figure 9:
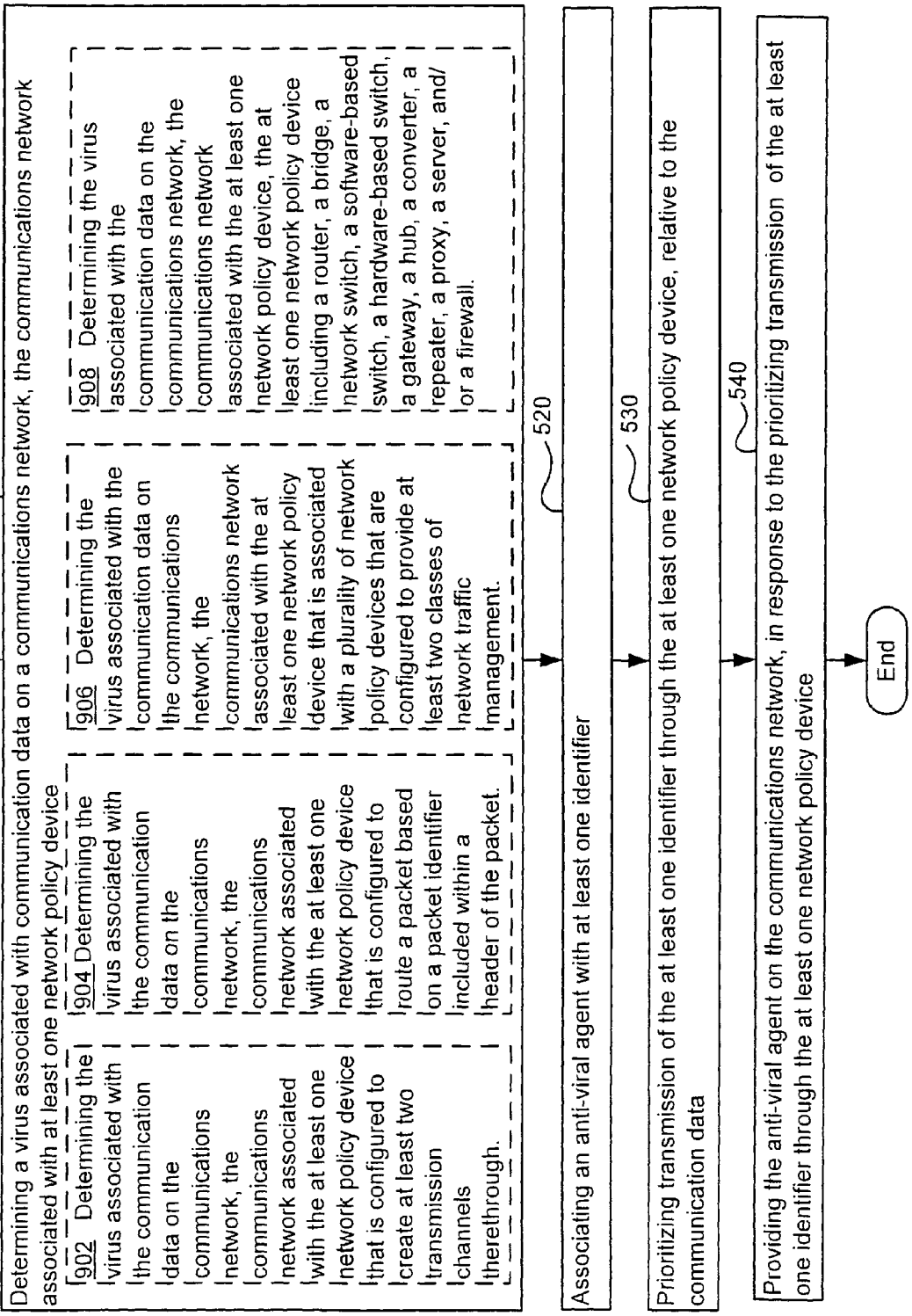
FIG. 9 illustrates an alternative embodiment of the example operational flow of FIG. 5.

FIG. 9 illustrates alternative embodiments of the example operational flow 500 of FIG. 5. FIG. 9 illustrates example embodiments where the determining operation 510 may include at least one additional operation. Additional operations may include an operation 902, an operation 904, an operation 906, and/or an operation 908.

At the operation 902, the virus associated with the communication data on the communications network may be determined, the communications network associated with the at least one network policy device that is configured to create at least two transmission channels therethrough. For example, as illustrated in FIG. 4 and discussed herein, the network policy device 202a may be configured to form a first-transmission channel for the conmnunication data 204 (and the virus 108) and a second transmission channel for the identifier 210.

At the operation 904, the virus associated with the communication data on the communications network may be determined, the communications network associated with the at least one network policy device that is configured to route a packet based on a packet identifier included within a header of the packet. For example, the identifier 210 may be included within a header of the data packet 208.

At the operation 906, the virus associated with the communication data on the communications network may be determined, the communications network associated with the at least one network policy device that is associated with a plurality of network policy devices that are configured to provide at least two classes of network traffic management. For example, the network policy devices 202a, 202b, 202c may provide two classes of network traffic, using, e.g., MPLS and/or DiffServ, as described herein. In this way, for example, the anti-viral agent 112 may be part of, or associated with, a higher-priority class than the communication data 204 (and the virus 108), so that the anti-viral agent 112 may be provided to the network device 206 in advance of an infection thereof by the virus 108.

At the operation 908, the virus associated with the communication data on the communications network may be determined, the communications network associated with the at least one network policy device, the at least one network policy device including a router, a bridge, a network switch, a software-based switch, a hardware-based switch, a gateway, a hub, a converter, a repeater, a proxy, a server, and/or a firewall. For example, the network policy device 202a may include a router implementing one of the various routing protocols described herein, or other protocols. In other example implementations, the network policy device 202a may include an application-specific integrated circuit (ASIC) based switch that provides some level of hardware-based switching that may provide faster transport of the identifier 210 than may be provided for the communication data 204 (and the virus 108).

Figure 10:
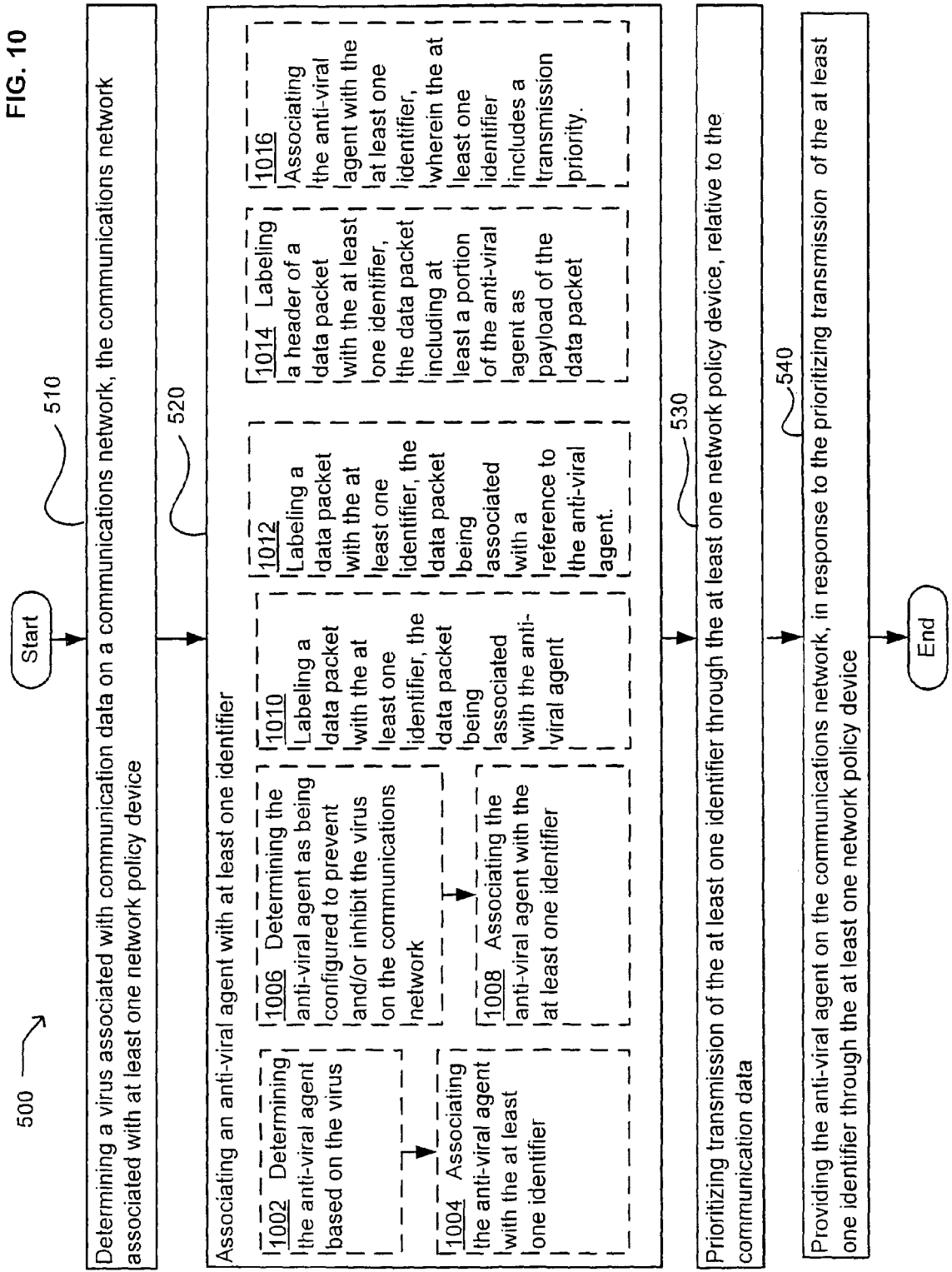
FIG. 10 illustrates an alternative embodiment of the example operational flow of FIG. 5.

FIG. 10 illustrates alternative embodiments of the example operational flow 500 of FIG. 5. FIG. 10 illustrates example embodiments where the associating operation 520 may include at least one additional operation. Additional operations may include an operation 1002, an operation 1004, an operation 1006, an operation 1008, an operation 1010, an operation 1012, an operation 1014, and/or an operation 1016.

At the operation 1002, the anti-viral agent may be determined based on the virus. For example, the network monitor 120 of the immunization system 110a may detect the virus 108 on the communications network 102. At the operation 1004, the anti-viral agent may be associated with the at least one identifier. For example, the identifier logic 216 may associate the identifier 210 with the anti-viral agent 112.

At the operation 1006, the anti-viral agent may be determined as being configured to prevent and/or inhibit the virus on the communications network. For example, the response generator 126 may determine the anti-viral agent 112 as being capable of immunizing the network device 206 against the virus 108. At the operation 1008, the anti-viral agent may be associated with the at least one identifier. For example, the identifier logic 216 may associate the identifier 210 with the anti-viral agent 112.

At the operation 1010, a data packet may be labeled with the at least one identifier, the data packet being associated with the anti-viral agent. For example, the response generator 126 and/or the identifier logic 216 may provide the identifier 210 within the data packet 208, perhaps as a label for implementing MPLS.

At the operation 1012, a data packet may be labeled with the at least one identifier, the data packet being associated with a reference to the anti-viral agent. For example, the response generator 126 and/or the identifier logic 216 may label the data packet 208 with the identifier 210, and the identifier 210 and/or the data packet 208 may be associated with, e.g., may contain, a reference to the anti-viral agent 112 (such as a URL to a site providing the anti-viral agent 112).

At the operation 1014, a header of a data packet may be labeled with the at least one identifier, the data packet including at least a portion of the anti-viral agent as payload of the data packet. For example, the response generator 126 and/or the identifier logic 216 may label the data packet 208 using the identifier 210, and the data packet 208 may contain at least a portion of the anti-viral agent 112 as payload.

At the operation 1016, the anti-viral agent may be associated with the at least one identifier, wherein the at least one identifier includes a transmission priority. For example, the identifier 210 may be associated with a transmission priority, such as, for example, a high-priority class of service within an implementation of DiffServ.

Figure 11:
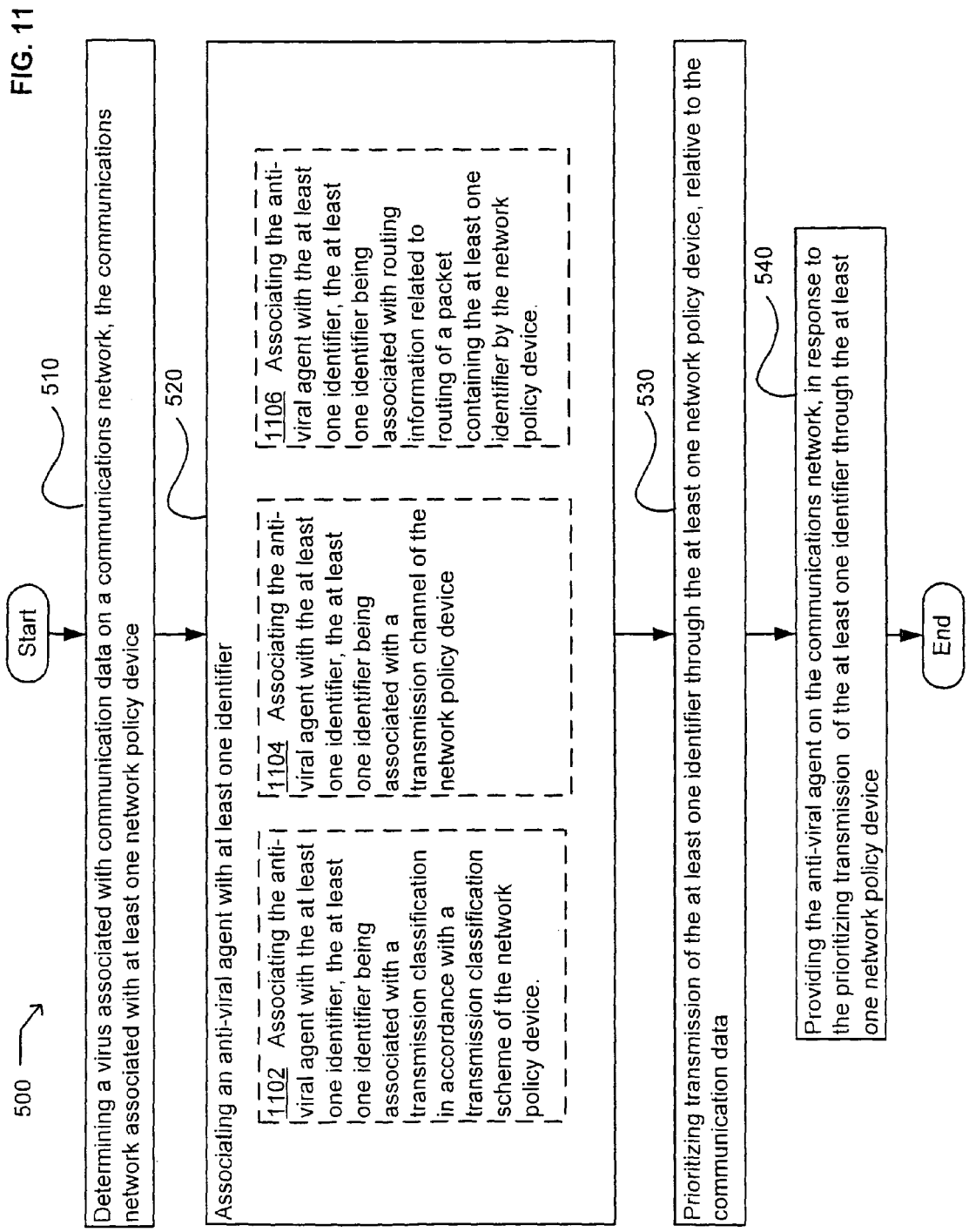
FIG. 11 illustrates an alternative embodiment of the example operational flow of FIG. 5.

FIG. 11 illustrates alternative embodiments of the example operational flow 500 of FIG. 5. FIG. 11 illustrates example embodiments where the associating operation 520 may include at least one additional operation. Additional operations may include an operation 1102, an operation 1104, and/or an operation 1106.

At the operation 1102, the anti-viral agent may be associated with the at least one identifier, the at least one identifier being associated with a transmission classification in accordance with a transmission classification scheme of the network policy device. For example, as described herein, the identifier 210 may be associated with a transmission classification scheme such as MPLS and/or DiffServ.

At the operation 1104, the anti-viral agent may be associated with the at least one identifier, the at least one identifier being associated with a transmission channel of the network policy device. For example, the network policy device 202a may provide multiple transmission channels, so that the identifier 210 is provided with a first, higher-priority transmission channel, while the communication data 204 (and the virus 108) is/are provided with another channel(s) having relative lower priority.

At the operation 1106, the anti-viral agent may be associated with the at least one identifier, the at least one identifier being associated with routing information related to routing of a packet containing the at least one identifier by the network policy device. For example, the routing logic 220 may route the data packet 208 within the network policy device 202a, perhaps using a routing table or other routing technique(s), so as to route the identifier 210 accordingly.

Figure 12:
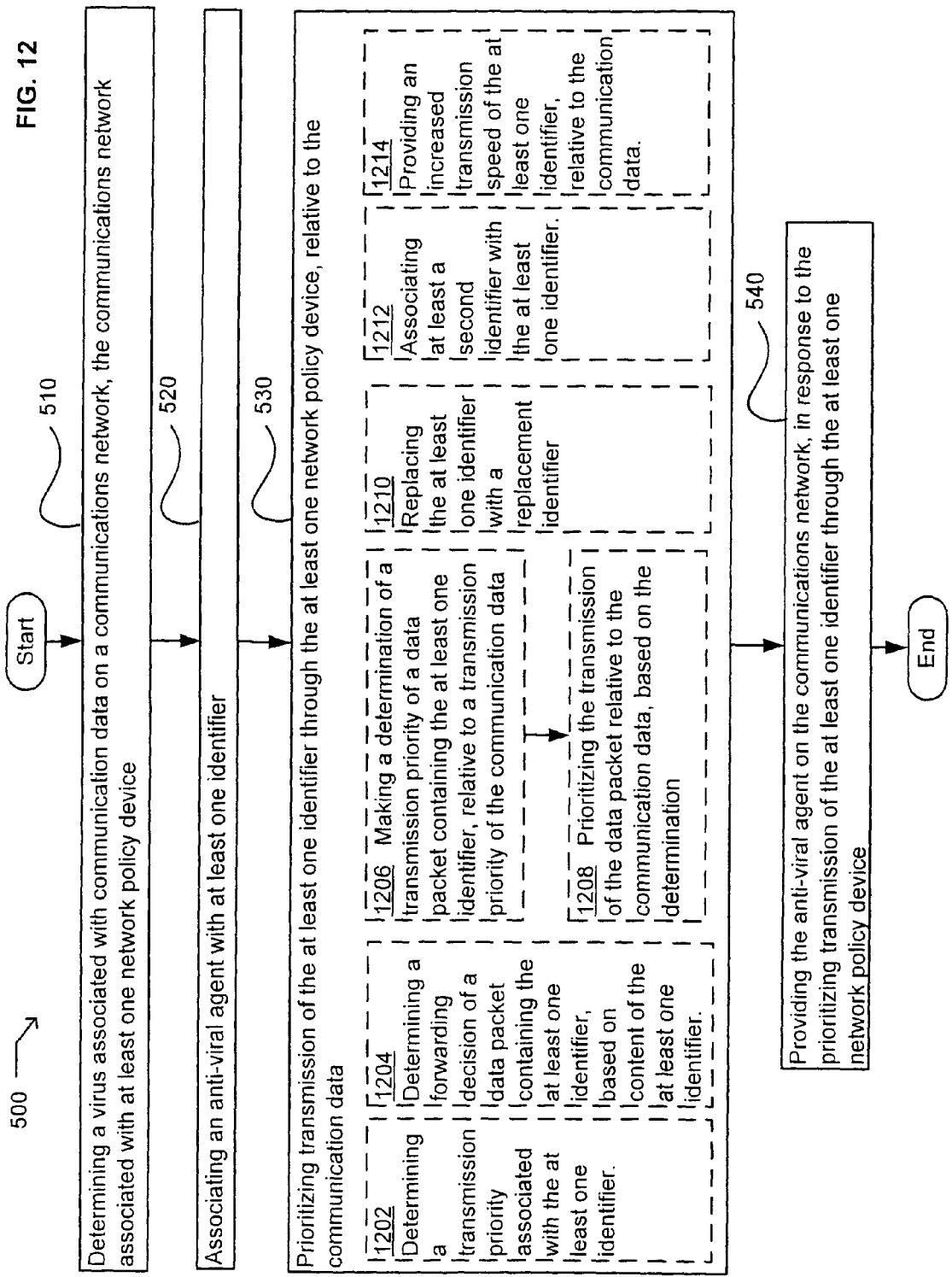
FIG. 12 illustrates an alternative embodiment of the example operational flow of FIG. 5.

FIG. 12 illustrates alternative embodiments of the example operational flow 500 of FIG. 5. FIG. 12 illustrates example embodiments where the prioritizing operation 530 may include at least one additional operation. Additional operations may include an operation 1202, an operation 1204, an operation 1206, an operation 1208, an operation 1210, an operation 1212, and/or an operation 1214.

At the operation 1202, a transmission priority associated with the at least one identifier may be determined. For example, the routing logic 220, perhaps within one or more of the network policy devices 202a, 202b, 202c, may determine a transmission priority of the identifier 210.

At the operation 1204, a forwarding decision of a data packet containing the at least one identifier may be determined, based on content of the at least one identifier. For example, the routing logic 220, perhaps within one or more of the network policy devices 202a, 202b, 202c, may forward the data packet 208, based on content of the identifier 210 (e.g., based on content of the identifier 210 that identifies the identifier 210 as being entitled to a high quality of service as part of a DiffServ implementation).

At the operation 1206, a determination of a transmission priority of a data packet containing the at least one identifier, relative to a transmission priority of the communication data, may be made. For example, the routing logic 220 may determine a transmission priority of the data packet 208, perhaps as part of an implementation of MPLS.

At the operation 1208, the transmission of the data packet may be prioritized relative to the communication data, based on the determination. For example, routing logic 220 may perform preferential forwarding of the data packet 208, and/or preferential discarding of the communication data 204 (which may contain the virus 108).

At the operation 1210, the at least one identifier may be replaced with a replacement identifier. For example, the routing logic 220 may implement MPLS, and may replace the (at least one) identifier 210 with a secondary identifier that more suitably prioritizes the transmission of the data packet 208. For example, if a threat level of the virus 108 is raised, then the immunization system 110a, e.g., the identifier logic 216, may raise a transmission priority of the anti-viral agent 112 and assign a correspondingly-higher identifier thereto.

At the operation 1212, at least a second identifier may be associated with the at least one identifier. For example, the identifier logic 216 may associate a second identifier with the data packet 208. For example, the second identifier may be useful in routing the data packet 208 across a plurality of networks/domains, e.g., as part of the provision of an end-to-end connection for providing the anti-viral agent 112.

At the operation 1214, an increased transmission speed of the at least one identifier may be provided, relative to the communication data. For example, the routing logic 220 and/or the network policy device 202a may route the data packet 208 over an at least partially physically separate network, which may be associated with a higher transmission speed than is available or allocated to the communication data 204.

Figure 13:
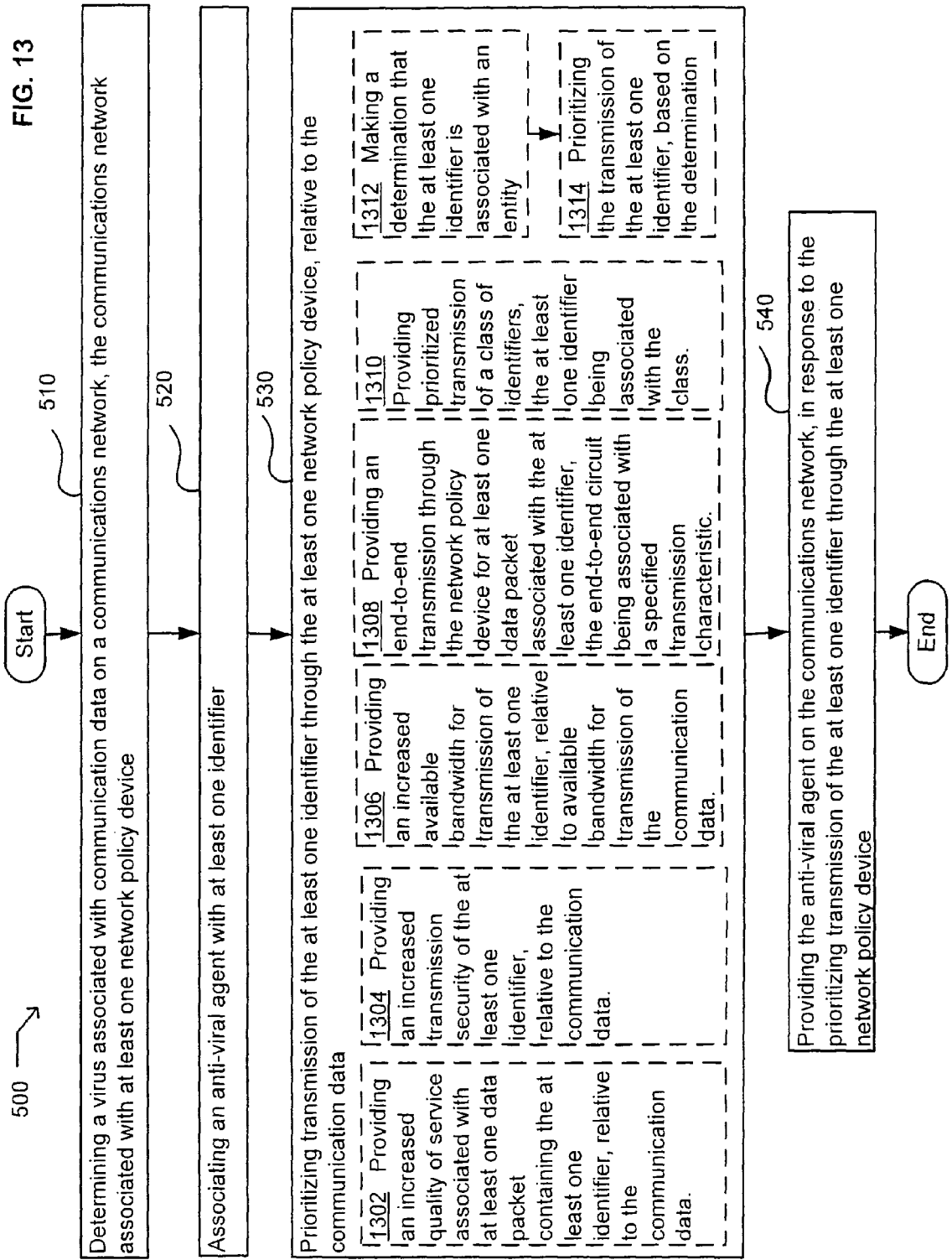
FIG. 13 illustrates an alternative embodiment of the example operational flow of FIG. 5.

FIG. 13 illustrates alternative embodiments of the example operational flow 500 of FIG. 5. FIG. 13 illustrates example embodiments where the prioritizing operation 530 may include at least one additional operation. Additional operations may include an operation 1302, an operation 1304, an operation 1306, an operation 1308, an operation 1310, an operation 1312, and/or an operation 1314.

At the operation 1302, an increased quality of service associated with at least one data packet containing the at least one identifier may be provided, relative to the communication data. For example, the routing logic 220 and/or the network policy device 202a may provide the data packet 208 with improved quality of service (QoS), including, for example, more/dedicated bandwidth, controlled latency, and/or improved loss characteristics.

At the operation 1304, an increased transmission security of the at least one identifier may be provided, relative to the communication data. For example, the network policy device 202a may provide encryption, or a higher level of encryption, to the data packet 208 that contains the anti-viral agent 112.

At the operation 1306, an increased available bandwidth may be provided for transmission of the at least one identifier, relative to available bandwidth for transmission of the communication data. For examnple, such an increase in bandwidth may be allocated to the identifier 210 as part of a DiffServ implementation in which a service level agreement specifies such a bandwidth assignment when the identifier 210 is associated with the second entity 140b.

At the operation 1308, an end-to-end transmission through the network policy device may be provided for at least one data packet associated with the at least one identifier, the end-to-end circuit being associated with a specified transmission characteristic. For example, in this regard, it should be understood that different MPLS and/or DiffServ domains (e.g., a "DiffServ cloud" of devices) often may have different policies. In the example of the operation 1308, then, the first entity 140a, using the network policy devices 202a, 202b, 202c, and other network policy devices (perhaps associated with the routing logic 220) may enforce standardized policies across such different domains/networks, so that an end-to-end transmission of the data packet 208, the identifier 210, and/or anti-viral agent 112 (or reference thereto) to the network device 206 may be provided.

At the operation 1310, prioritized transmission of a class of identifiers may be provided, the at least one identifier being associated with the class. For example, the routing logic 220 may implement DiffServ, and the identifier 210 may be associated with a class of identifiers or service(s) associated with the second entity 140b (which, as described herein, may pay for prioritized transmission thereof).

At the operation 1312, a determination that the at least one identifier is associated with an entity may be made. For example, the identifier logic 216 and/or the routing logic 220 may determine that the identifier 210 is associated with the entity 140b.

At the operation 1314, the transmission of the at least one identifier may be prioritized, based on the determination. For example, the network policy device 202a may perform preferred routing of the identifier 210, based on the determination of the association therewith of the second entity 140b.

Figure 14:
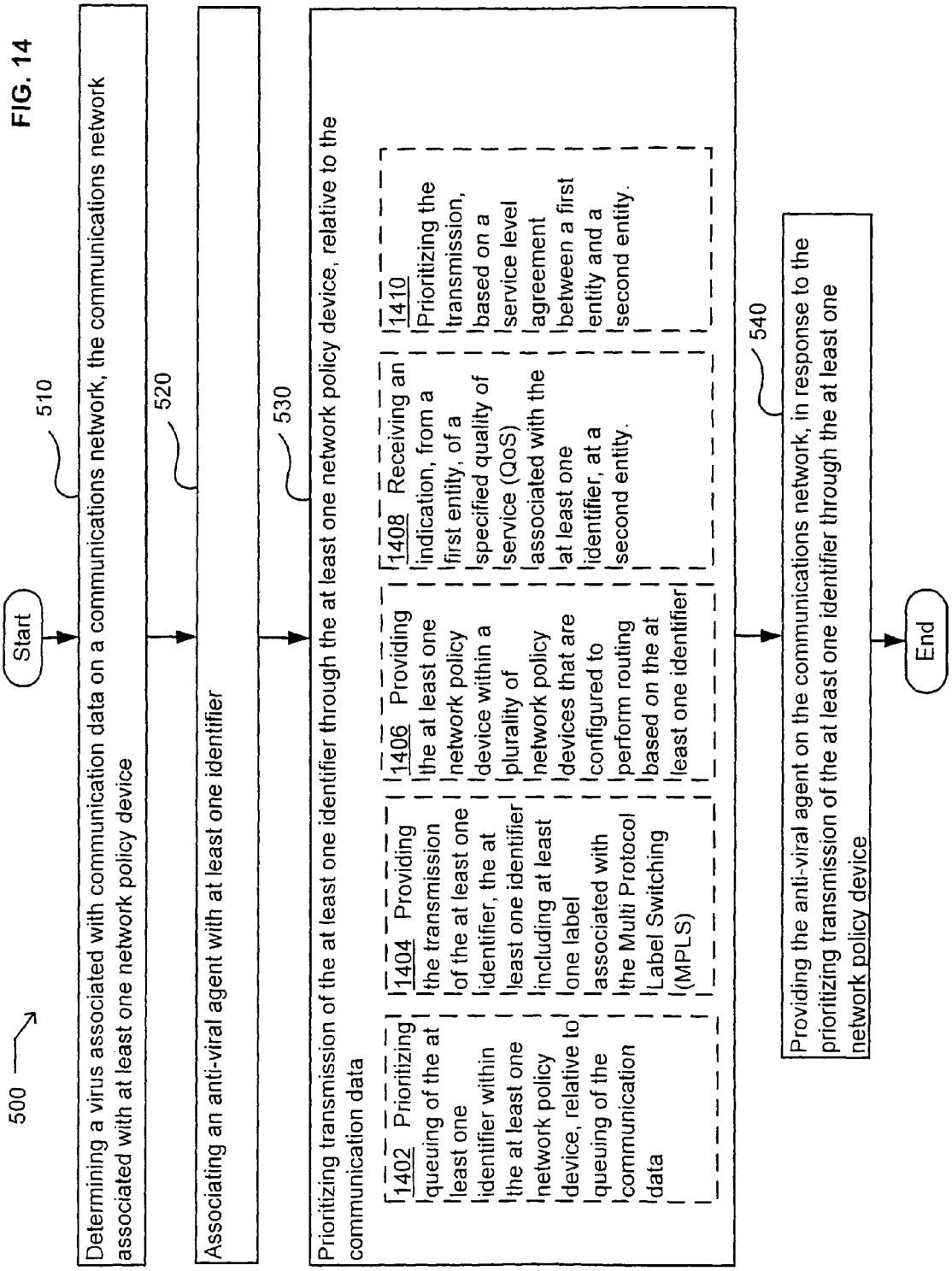
FIG. 14 illustrates an alternative embodiment of the example operational flow of FIG. 5.

FIG. 14 illustrates alternative embodiments of the example operational flow 500 of FIG. 5. FIG. 14 illustrates example embodiments where the prioritizing operation 530 may include at least one additional operation. Additional operations may include an operation 1402, an operation 1404, an operation 1406, an operation 1408, and/or an operation 1410.

At the operation 1402, queuing of the at least one identifier within the at least one network policy device may be prioritized, relative to queuing of the communication data. For example, the network policy device 202a may implement the queue 212 as being associated with (higher-priority) transmission of the identifier 210, relative to transmission of the communication data 204 (and the virus 108) that may occur using the queue 214 (e.g., whenever data is in the queue 212, then this data may be forwarded immediately, even if the queue 214 is fall). In other implementations, the network policy device 202a may implement prioritized queuing using just the queue 212, by, for example, performing a preferred placement of the data packet 208 within the queue 212, relative to the communication data 204.

At the operation 1404, the transmission of the at least one identifier may be provided, the at least one identifier including at least one label associated with the Multi-Label Switching Protocol (MPLS). For example, the identifier 210 may include a MPLS label, and one or more of the network policy devices 202a, 202b, 202c and/or the immunization system 110a may implement MPLS.

At the operation 1406, the at least one network policy device may be provided within a plurality of network policy devices that are configured to perform routing based on the at least one identifier. For example, as shown in FIG. 4, the network policy device 202a may be provided within a plurality of network policy devices 202a, 202b, 202c, which may perform routing of the identifier 210, perhaps at the direction of the routing logic 220 of the immunization system 110a.

At the operation 1408, an indication from a first entity may be received at a second entity, of a specified quality of service (QoS) associated with the at least one identifier. For example, the first entity 140a, which may include a network provider for the communication network 102, may provide a specified quality of service to the second entity 140b, which may include an anti-virus service provider.

At the operation 1410 the transmission may be prioritized, based on a service level agreement between a first entity and a second entity. For example, as just referenced, the first entity 140a may include a network provider for the communication network 102, which may have a service level agreement with the second entity 140b, which may include an anti-virus service provider. In this way, the second entity 140b (e.g., the anti-virus service provider) may perform a function of immunizing the network device 206 and similar devices.

Figure 15:
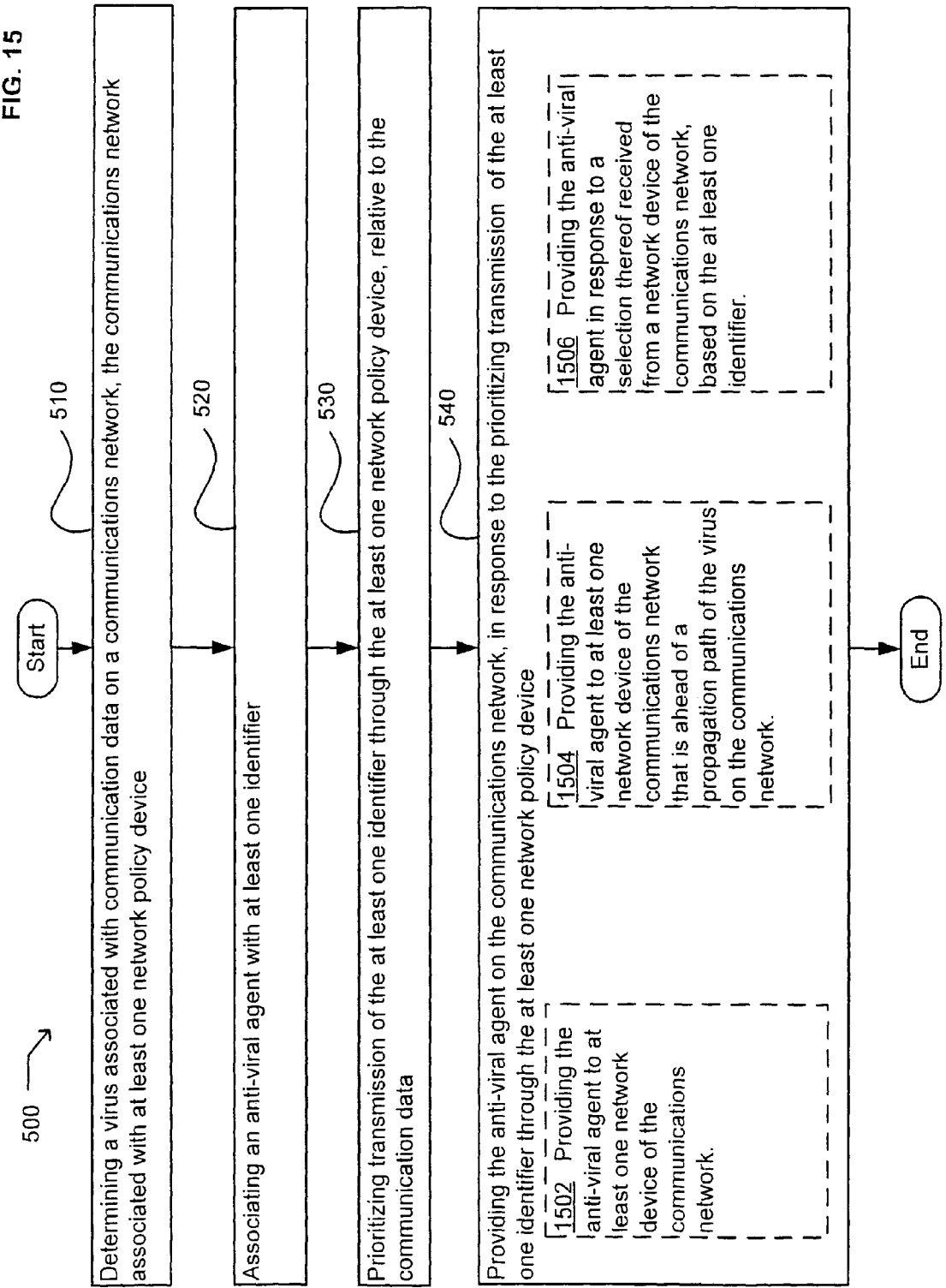
FIG. 15 illustrates an alternative embodiment of the example operational flow of FIG. 5.

FIG. 15 illustrates alternative embodiments of the example operational flow 500 of FIG. 5. FIG. 15 illustrates example embodiments where the providing operation 540 may include at least one additional operation. Additional operations may include an operation 1502, an operation 1504, and/or an operation 1506.

At the operation 1502, the anti-viral agent may be provided to at least one network device of the communications network. For example, the network policy device 202a, or a subsequent device, not shown in FIG. 4, may provide the anti-viral agent 112 to the network device 206.

At the operation 1504, the anti-viral agent 112 may be provided to at least one network device of the communications network that is ahead of a propagation path of the virus on the communications network. For example, as described herein, the virus 108 may be propagating over the communications network 102, and may have a "head-start" over the anti-viral agent 112. In this case, the prioritized transmission of the identifier 210 by (at least) the network policy device 202a may allow for provision of the anti-viral agent to the network device 206, so as to immunize the network device 206 against the virus 108, before the virus 108 can propagate thereto.

At the operation 1506, the anti-viral agent may be provided in response to a selection thereof received from a network device of the communications network, based on the at least one identifier. For example, the data packet 208 may be provided to the network device 206 by the network policy device 202a, based on the identifier 210. The network device 206 (e.g., a user thereof) may select a URL associated with the data packet 208, so as to obtain the anti-viral agent 112.

Figure 16:
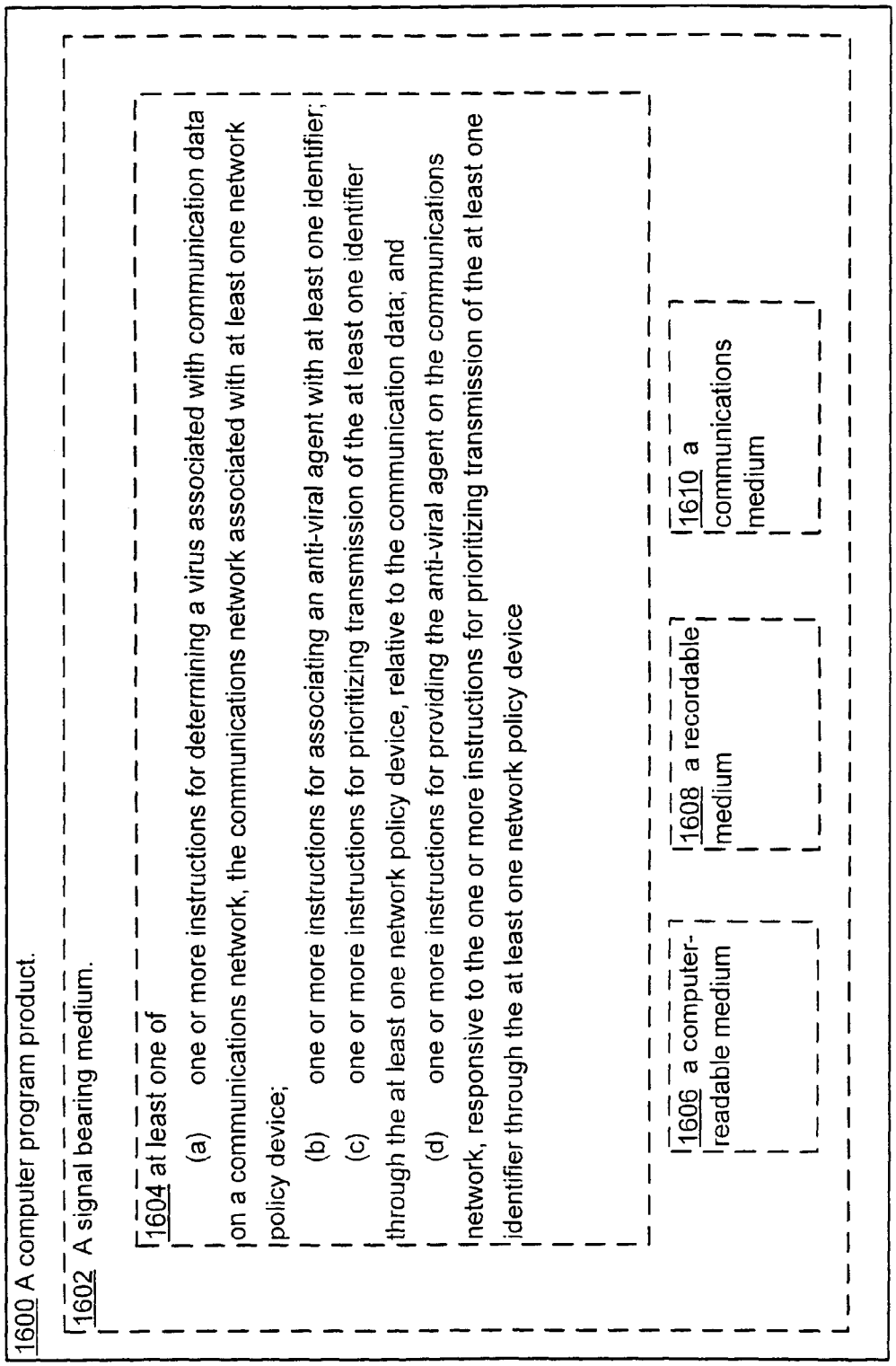
FIG. 16 is a partial view of an example computer program product that includes a computer program for executing a computer process on a computing device.

FIG. 16 illustrates a partial view of an example computer program product 1600 that includes a computer program 1604 for executing a computer process on a computing device. An embodiment of the example computer program product 1600 is provided using a signal bearing medium 1602, and may include at least one or more instructions 1604 for determining a virus associated with communication data on a communications network, the communications network associated with at least one network policy device, and the signal bearing medium 1602 also bearing one or more instructions for associating an anti-viral agent with at least one identifier, and the signal bearing medium 1602 also bearing one or more instructions for prioritizing transmission of the at least one identifier through the at least one network policy device, relative to the communication data, and the signal bearing medium 1602 also bearing one or more instructions for providing the anti-viral agent on the communications network, responsive to the one or more instructions for prioritizing transmission of the at least one identifier through the at least one network policy device. The one or more instructions may be, for example, computer executable and/or logic-implemented instructions. In one implementation, the signal-bearing medium 1602 may include a computer-readable medium 1606. In one implementation, the signal bearing medium 1602 may include a recordable medium 1608. In one implementation, the signal bearing medium 1602 may include a communications medium 1610.

Figure 17:
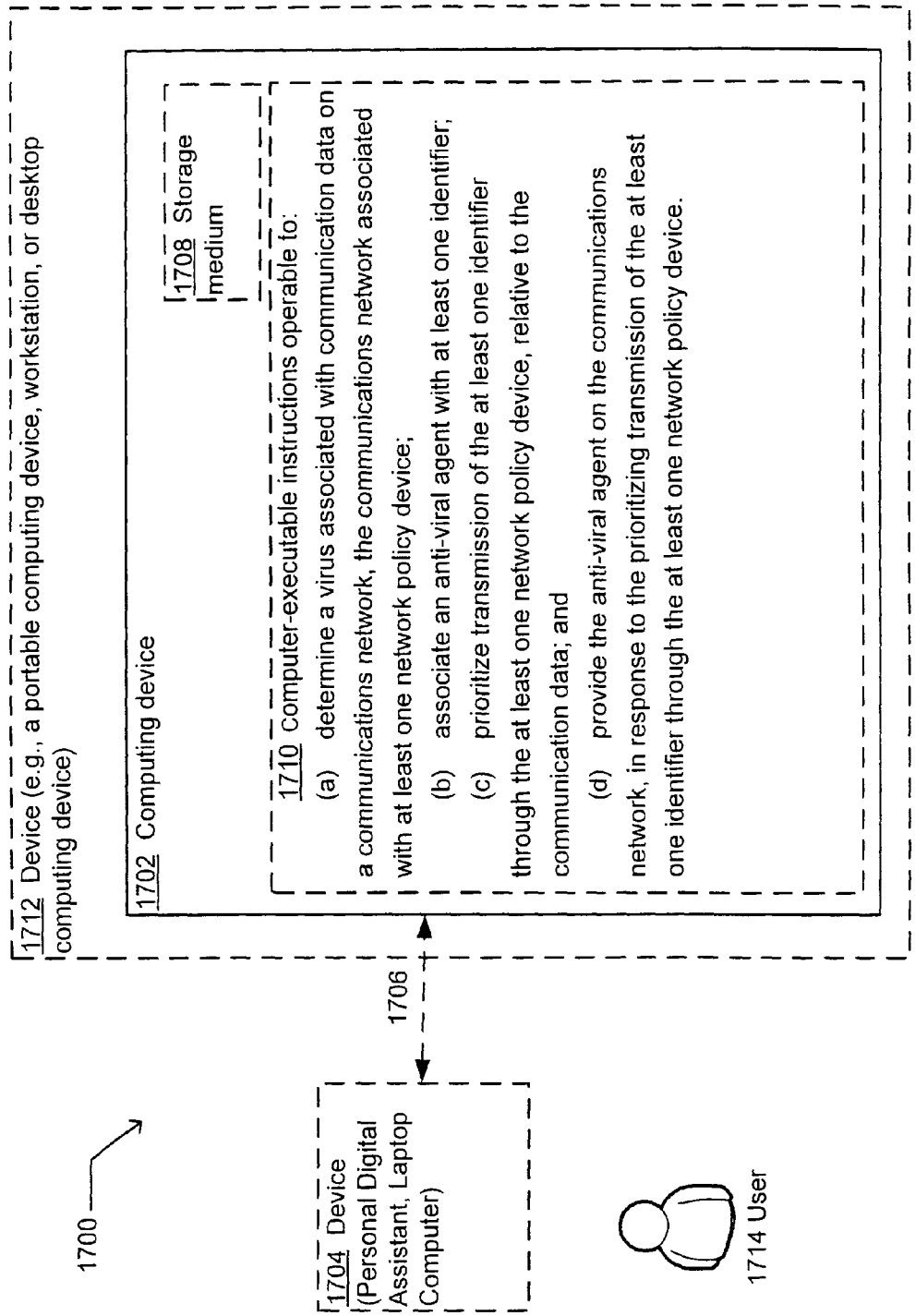
FIG. 17 illustrates an example system in which embodiments may be implemented.

FIG. 17 illustrates an example system 1700 in which embodiments may be implemented. The system 1700 includes a computing system environment. The system 1700 also illustrates the user 1714 using a device 1704, which is optionally shown as being in communication with a computing device 1702 by way of an optional coupling 1706. The optional coupling 1706 may represent a local, wide-area, or peer-to-peer network, or may represent a bus that is internal to a computing device (e.g., in example embodiments in which the computing device 1702 is contained in whole or in part within the device 1704). A storage medium 1708 may include virtually any computer storage mnedia.

The computing device 1702 includes computer-executable instructions 1710 that when executed on the computing device 1702 cause the computing device 1702 to determine a virus associated with communication data on a communications network, the communications network associated with at least one network policy device, associate an anti-viral agent with at least one identifier, prioritize transmission of the at least one identifier through the at least one network policy device, relative to the communication data, and provide the anti-viral agent on the communications network, in response to the prioritizing transmission of the at least one identifier through the at least one network policy device.

In FIG. 17, then, the system 1700 includes at least one computing device (e.g., 1702 and/or 1704). The computer-executable instructions 1710 may be executed on one or more of the at least one computing device. For example, the computing device 1702 may implement the computer-executable instructions 1710 and output a result to (and/or receive data from) the computing device 1704. Since the computing device 1702 may be wholly or partially contained within the device 1712, the device 1712 also may be said to execute some or all of the computer-executable instructions 1710, in order to be caused to perform or implement, for example, various ones of the techniques described herein, or other techniques.

The computer-executable instructions 1710 are shown including instructions that when executed on the computing device cause the computing device to (a) determine a virus associated with communication data on a communications network, the communications network associated with at least one network policy device; (b) associate an anti-viral agent with at least one identifier; (c) prioritize transmission of the at least one identifier through the at least one network policy device, relative to the communication data; and (d) provide the anti-viral agent on the communications network, in response to the prioritizing transmission of the at least one identifier through the at least one network policy device. In addition, those skilled in the art will understand that computer-executable instructions 1710 may further include one or more instructions sufficient to perform one or more of the operations illustrated and/or described in relation to one or more of FIG. 5 through FIG. 15, but that such operations are not shown expressly herein for sake of clarity.

The device 1704 may include, for example, one or more of a server, a personal digital assistant (PDA) or cell phone, a laptop computer, a tablet personal computer, a networked computer, a computing system comprised of a cluster of processors, a workstation computer, and/or a desktop computer. In another example embodiment, the device 1704 may be operable to provide the anti-viral agent to the communications network 102 and prevent, reduce, or inhibit propagation of the virus 108 thereon.

Figure 18:
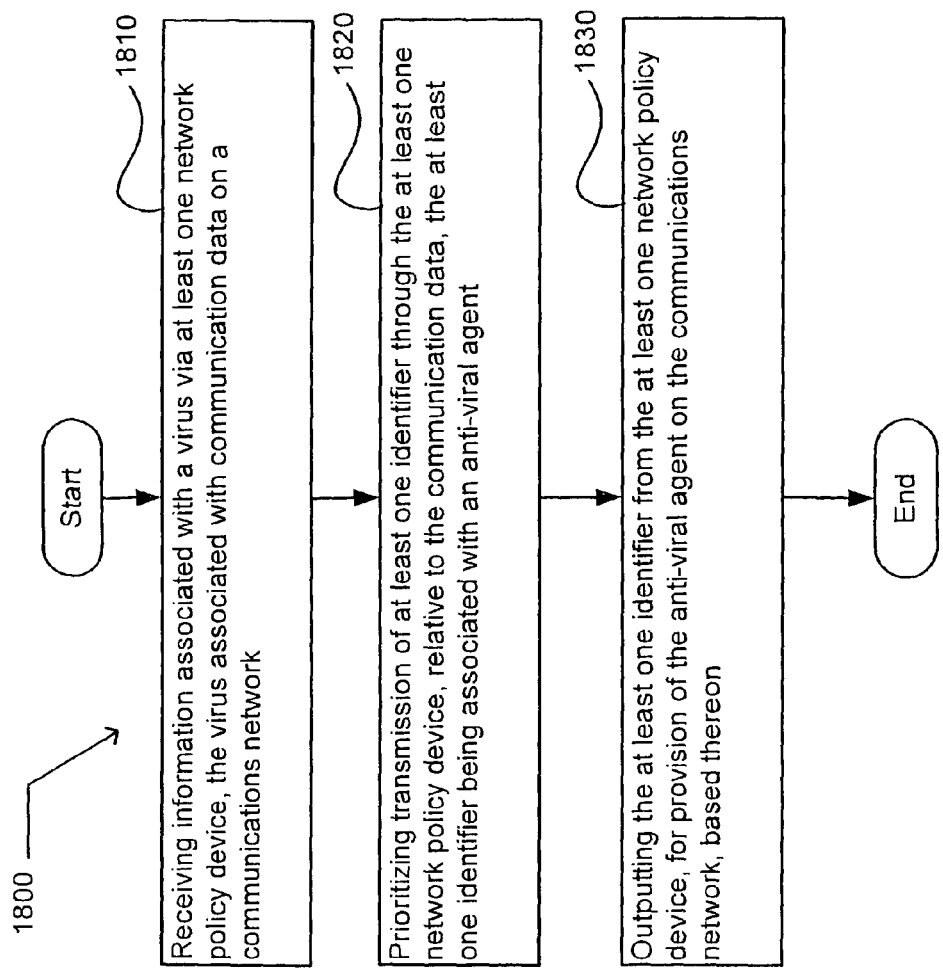
FIG. 18 illustrates an operational flow representing example operations related to techniques used by a network policy device for virus immunization using prioritized routing.

FIG. 18 illustrates an operational flow 1800 representing example operations related to techniques used by a network policy device for virus immunization using prioritized routing. As with FIG. 5, in FIG. 18 and in following figures that include various examples of operational flows, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. Also, although the various operational flows are presented in the sequence(s) illustrated, it should be understood that the various operations may be performed in other orders than those which are illustrated, or may be performed concurrently.

After a start operation, the operational flow 1800 moves to a receiving operation 1810 in which information associated with a virus may be received via at least one network policy device, the virus associated with communication data on a communications network. For example, the network policy device 202*a* may receive information associated with the virus 108.

Then, in a prioritizing operation 1820, transmission of at least one identifier through the at least one network policy device may be prioritized, relative to the communication data, the at least one identifier being associated with an anti-viral agent. For example, the network policy device 202*a* may prioritize transmission of the identifier 208, relative to the communication data 204 (which may include the virus 108).

In an outputting operation 1830, the at least one identifier may be output from the at least one network policy device, for provision of the anti-viral agent on the communications network, based thereon. For example, the network policy device 202*a* may output the identifier 210, e.g., for forwarding to the network policy device 202*c* and for ultimate forwarding to the network device 206.

As a result of the operations 1810-1830, operation(s) may be performed that are related either to a local or remote storage of digital data, or to another type of transmission of digital data. As discussed herein, in addition to accessing, querying, recalling, or otherwise determining the digital data for the operations 1810-1830, operations may be performed related to storing, assigning, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 19:
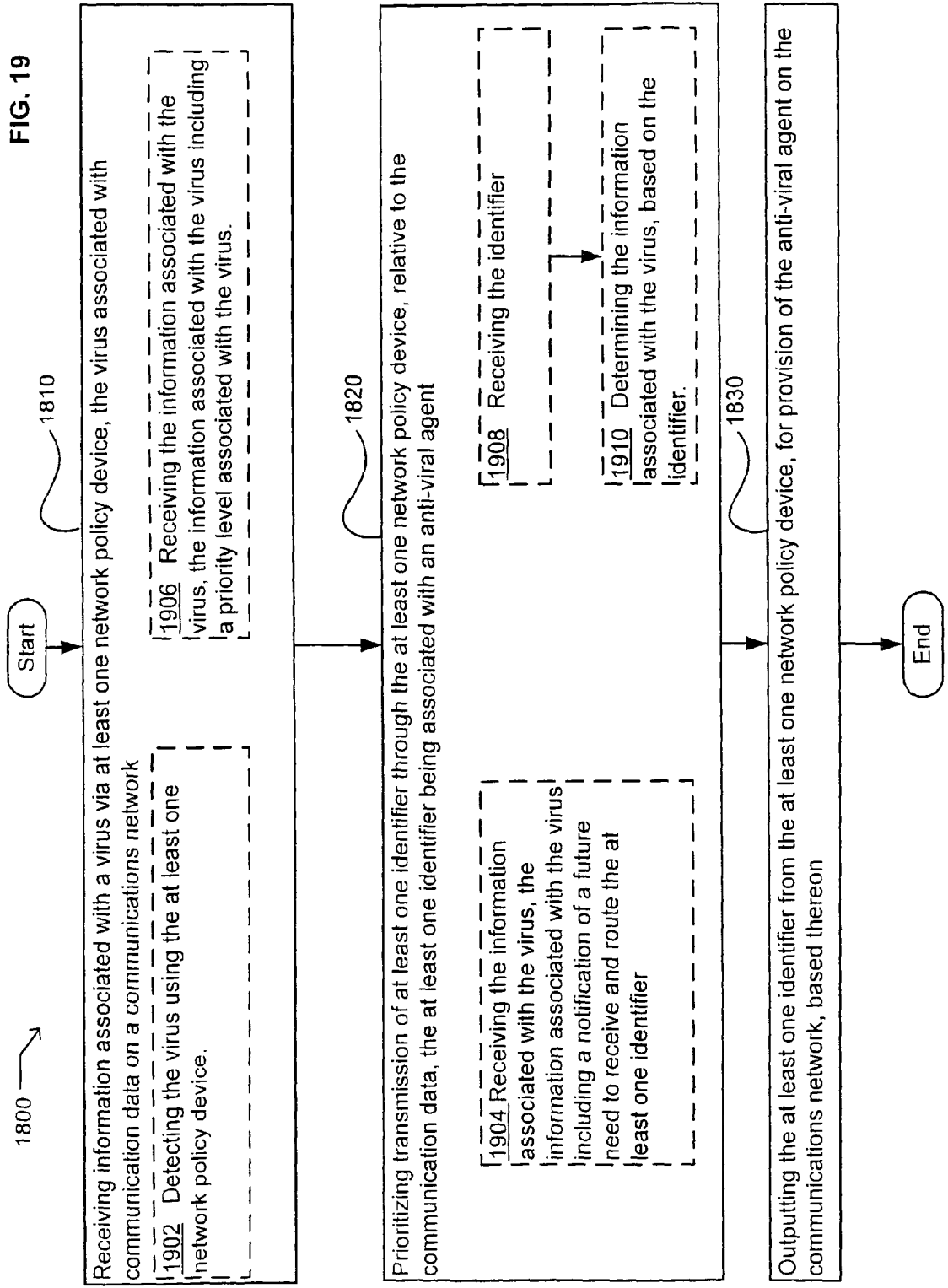
FIG. 19 illustrates an alternative embodiment of the example operational flow of FIG. 18.

FIG. 19 illustrates alternative embodiments of the example operational flow 1800 of FIG. 18. FIG. 19 illustrates example embodiments where the receiving operation 1810 and/or the prioritizing operation 1820 may include at least one additional operation. Additional operations may include an operation 1902, an operation 1904, an operation 1906, an operation 1908, and/or an operation 1910.

At the operation 1902, the virus may be detected using the at least one network policy device. For example, the network policy device 202a may detect the virus 108, perhaps by implementing the network monitor 120 of the immunization system 110a.

At the operation 1904, the information associated with the virus may be received, the information associated with the virus including a notification of a future need to receive and route the at least one identifier. For example, the network policy device 202a may receive a warning or alert, perhaps from the network policy device 202b and/or from the first entity 140a and/or the second entity 140b that the virus 108 is present on the communications network 102. Consequently, the network policy device 202a may prepare for recognition and routing of the identifier 210, based on the warning or alert.

At the operation 1906, the information associated with the virus may be received, the information associated with the virus including a priority level associated with the virus. For example, the network policy device 202a may receive an indication of a threat level associated with the virus perhaps from the network policy device 202b and/or from the first entity 140a and/or the second entity 140b.

At the operation 1908, the identifier may be received. For example, the network policy device 202a may receive the identifier 210.

At the operation 1910, the information associated with the virus may be determined, based on the identifier. For example, the network policy device 202a may determine information about the virus 108, based on the identifier 210.

Figure 20:
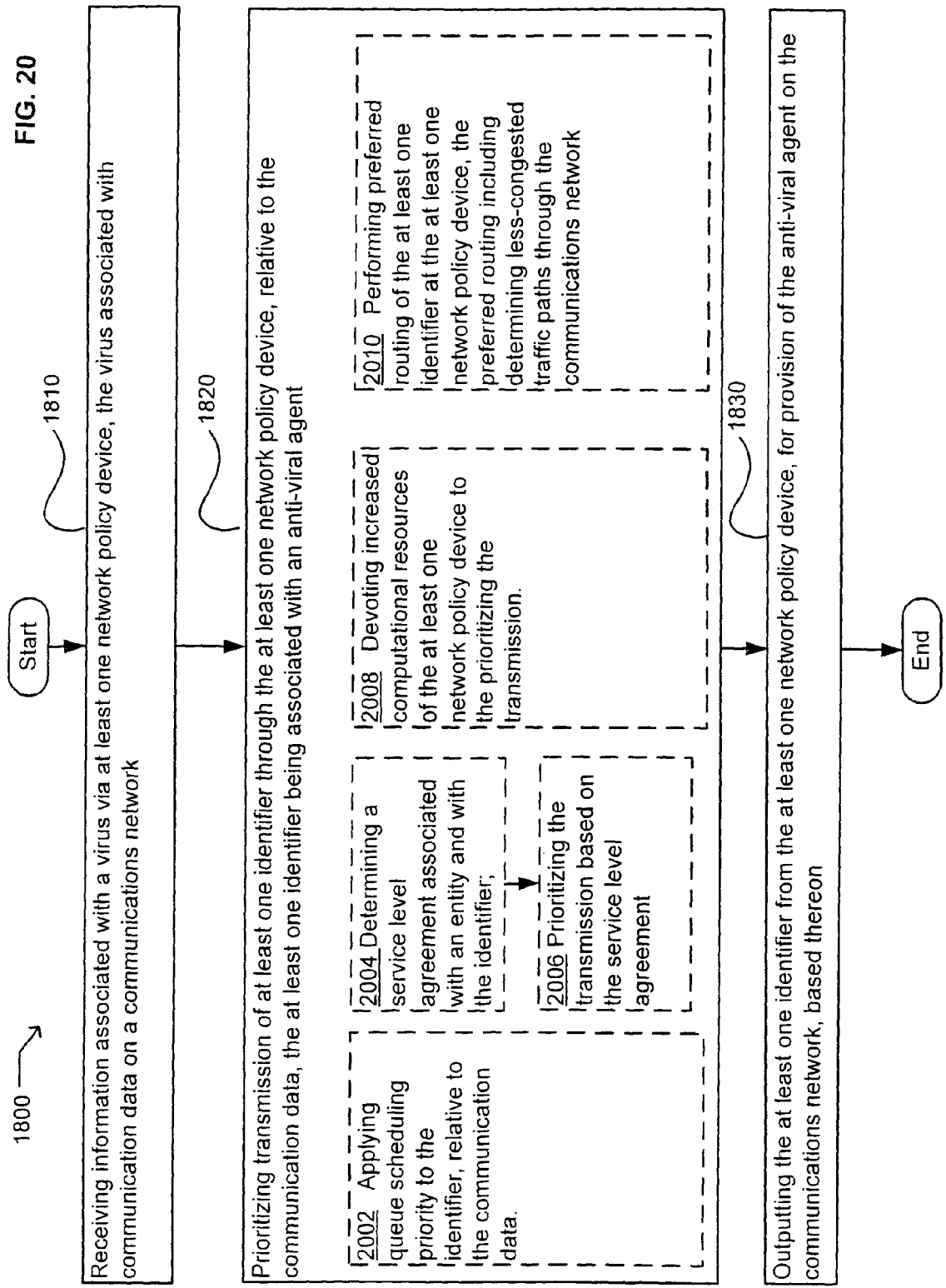
FIG. 20 illustrates an alternative embodiment of the example operational flow of FIG. 18.

FIG. 20 illustrates alternative embodiments of the example operational flow 1800 of FIG. 18. FIG. 20 illustrates example embodiments where the prioritizing operation 1820 may include at least one additional operation. Additional operations may include an operation 2002, an operation 2004, an operation 2006, an operation 2008, and/or an operation 2010.

At the operation 2002, queue scheduling priority may be applied to the identifier, relative to the communication data. For example, the network policy device 202a may implement queue scheduling priority using one or both of the queue 212 and/or the queue 214, as described herein.

At the operation 2004, a service level agreement may be determined that is associated with an entity and with the identifier. For example, the network policy device 202a may determine a service level agreement between the first entity 140a and the second entity 140b.

At the operation 2006, the transmission may be prioritized, based on the service level agreement. For example, the network policy device 202a may prioritize transmission of the identifier 210, based on a determination from a service level agreement that the identifier 210 is associated with the second entity 140b and should be prioritized accordingly.

At the operation 2008, increased computational resources of the at least one network policy device may be devoted to the prioritizing the transmission. For example, the network policy device 202a may devote more memory, processing power, and/or bandwidth to the prioritizing of the transmission of the identifier 210.

At the operation 2010, preferred routing of the at least one identifier may be performed at the at least one network policy device, the preferred routing including determining less-congested traffic paths through the communications network. For example, the network policy device 202a may determine that a path to the network device 206 is more congested through the network policy device 202c, and so may prioritize transmission of the identifier 210 by forwarding the data packet 208 to the network device 206 by a different, less-congested pathway.

Figure 21:
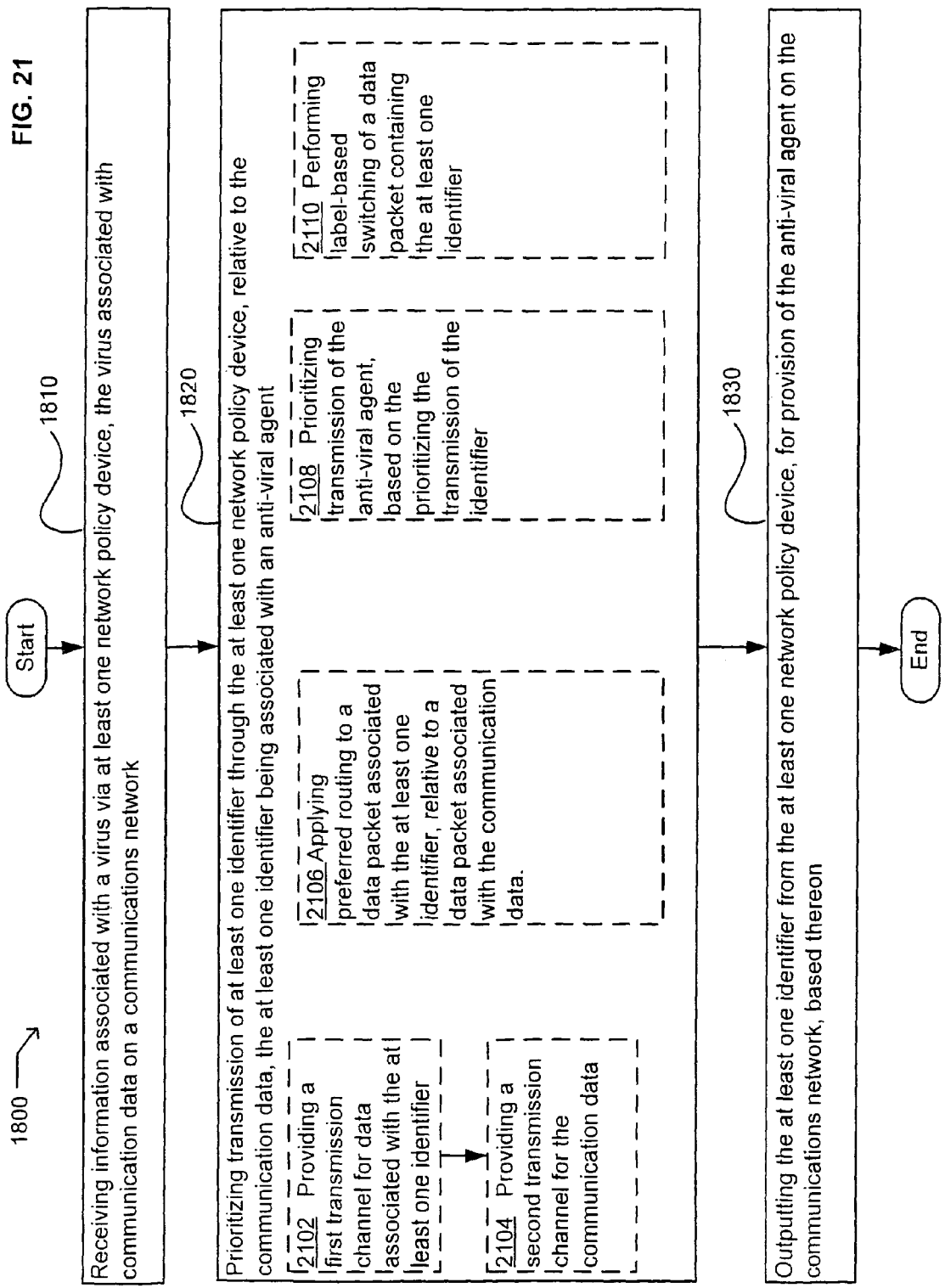
FIG. 21 illustrates an alternative embodiment of the example operational flow of FIG. 18.

FIG. 21 illustrates alternative embodiments of the example operational flow 1800 of FIG. 18. FIG. 21 illustrates example embodiments where the prioritizing operation 1820 may include at least one additional operation. Additional operations may include an operation 2102, an operation 2104, an operation 2106, and operation 2108, and/or an operation 2110.

At the operation 2102, a first transmission channel may be provided for data associated with the at least one identifier. For example, the network policy device 202a may provide a first transmission channel for the identifier 210, perhaps using the queue 212.

At the operation 2104, a second transmission channel may be provided for the communication data. For example, the network policy device 202a may provide a second transmission channel for the communication data 204 (which may include the virus 108).

At the operation 2106, preferred routing may be applied to a data packet associated with the at least one identifier, relative to a data packet associated with the communication data. For example, the network policy device 202a may either perform preferential forwarding of the data packet 208, and/or may provide preferential discarding of data packets of the communication data 204.

At the operation 2108, transmission of the anti-viral agent may be prioritized, based on the prioritizing the transmission of the identifier. For example, the network policy device 202a may prioritize transmission of the anti-viral agent 112 by virtue of an inclusion of the anti-viral agent 112 within the data packet 208 with the identifier 210.

At the operation 2110, label-based switching of a data packet containing the at least one identifier may be performed. For example, the network policy device 202a may implement MPLS to forward the data packet 208, containing the identifier 210.

Figure 22:
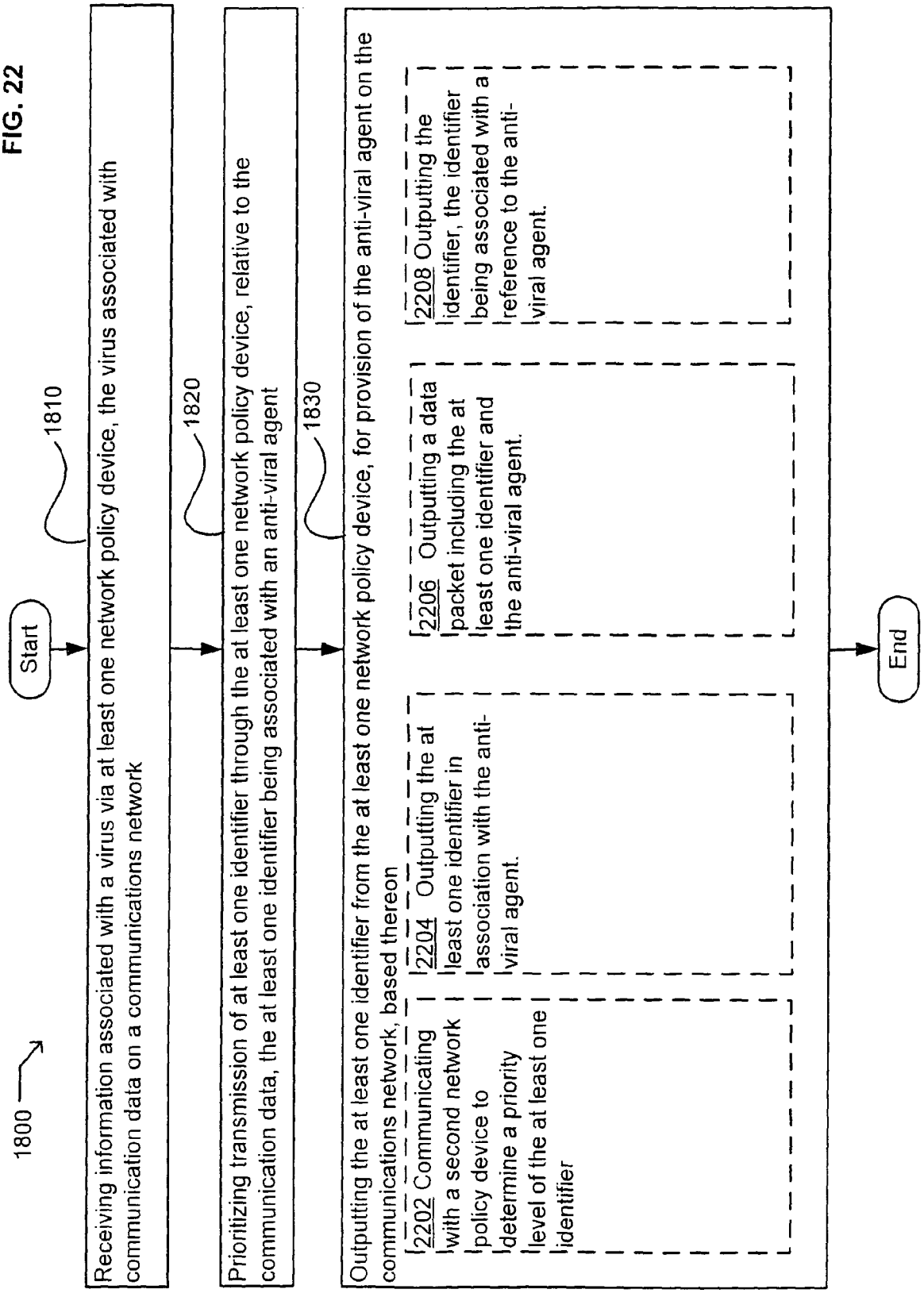
FIG. 22 illustrates an alternative embodiment of the example operational flow of FIG. 18.

FIG. 22 illustrates alternative embodiments of the example operational flow 1800 of FIG. 18. FIG. 22 illustrates example embodiments where the prioritizing operation 1820 may include at least one additional operation. Additional operations may include an operation 2202, an operation 2204, an operation 2206, and/or an operation 2208.

At the operation 2202, a second network policy device may be communicated with to determine a priority level of the at least one identifier. For example, the network policy device 202a may communicate with the network policy device 202b and/or the network policy device 202c to determine a priority level of the identifier 210 (and may thereby determine an extent to which transmission of the identifier 210 should be prioritized).

At the operation 2204, the at least one identifier may be output in association with the anti-viral agent. For exanple, the network policy device 202a may forward the identifier 210 in association with the anti-viral agent 112 to the network policy device 202c and/or to the network device 206.

At the operation 2206, a data packet including the at least one identifier and the anti-viral agent may be output. For example, the network policy device 202a may output the data packet 208, after performing routing thereof, the data packet containing both the identifier 210 and the anti-viral agent 112.

At the operation 2208, outputting the identifier, the identifier being associated with a reference to the anti-viral agent. For example, the network policy device 202a may output the identifier 210 in association with a reference or pointer to the anti-viral agent 112.

Figure 23:
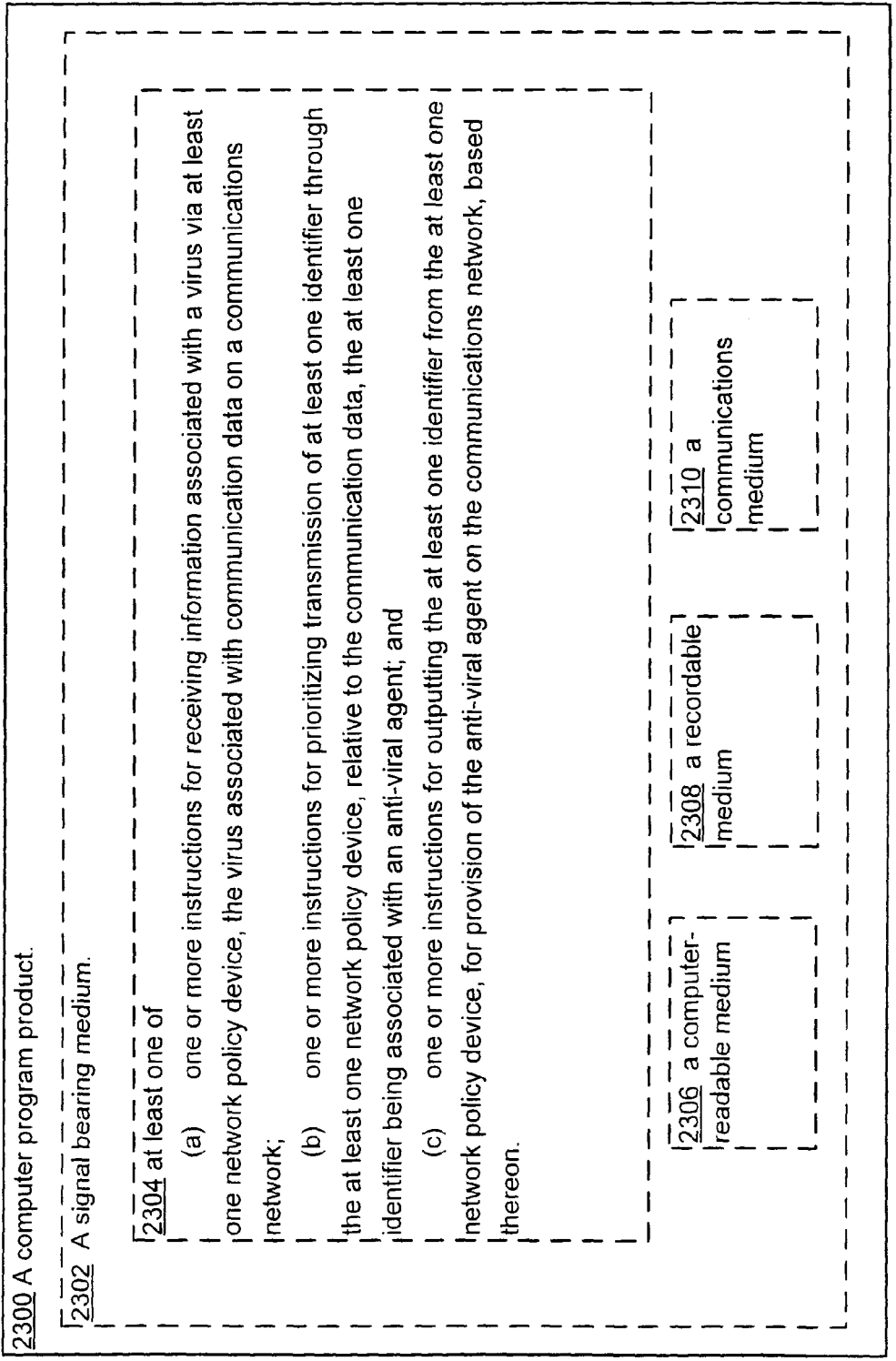
FIG. 23 illustrates a partial view of an example computer program product that includes a computer program for executing a computer process on a computing device.

FIG. 23 illustrates a partial view of an example computer program product 2300 that includes a computer program 2304 for executing a computer process on a computing device. An embodiment of the example computer program product 2300 is provided using a signal bearing medium 2302, and may include at least one of one or more instructions for receiving information associated with a virus via at least one network policy device, the virus associated with communication data on a communications network, and the signal bearing medium 2302 also bearing one or more instructions for prioritizing transmission of at least one identifier through the at least one network policy device, relative to the communication data, the at least one identifier being associated with an anti-viral agent, and the signal bearing medium 2302 also bearing one or more instructions for outputting the at least one identifier from the at least one network policy device, for provision of the anti-viral agent on the communications network, based thereon. The one or more instructions may be, for example, computer executable and/or logic-implemented instructions. In one implementation, the signal-bearing medium 2302 may include a computer-readable medium 2306. In one implementation, the signal bearing medium 2302 may include a recordable medium 2308. In one implementation, the signal bearing medium 2302 may include a communications medium 2310.

Figure 24:
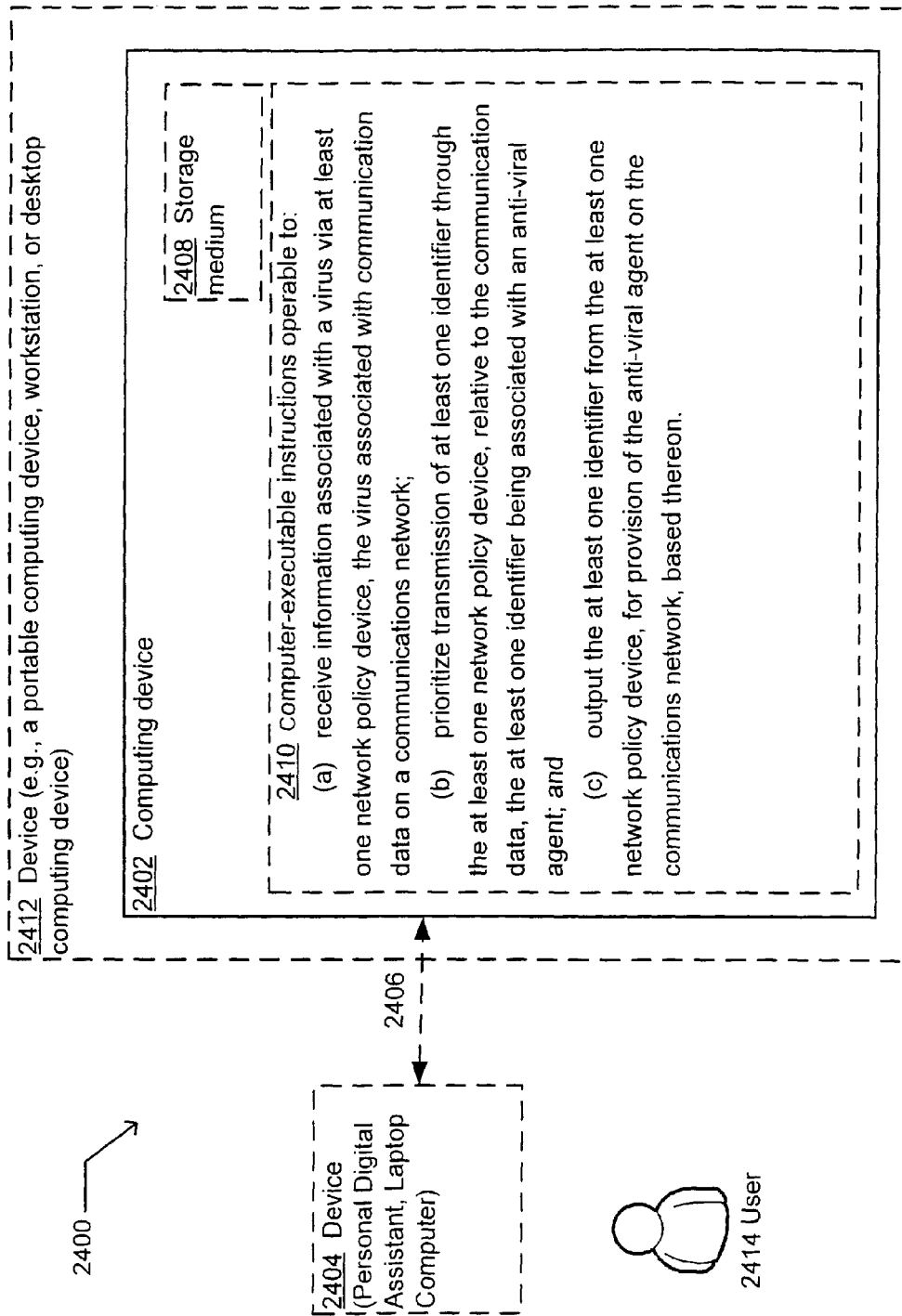
FIG. 24 illustrates an example system in which embodiments may be implemented.

FIG. 24 illustrates an example system 2400 in which embodiments may be implemented. The system 2400 includes a computing system environment. The system 2400 also illustrates the user 2414 using a device 2404, which is optionally shown as being in communication with a computing device 2402 by way of an optional coupling 2406. The optional coupling 2406 may represent a local, wide-area, or peer-to-peer network, or may represent a bus that is internal to a computing device (e.g., in example embodiments in which the computing device 2402 is contained in whole or in part within the device 2404, or vice-versa). Thus, the computing device 2402 and/or the computing device 2404 may represent or include, for example, the network policy device 202*a*. A storage medium 2408 may include virtually any computer storage media.

The computing device 2402 includes computer-executable instructions 2410 that when executed on the computing device 2402 cause the computing device 2402 to receive information associated with a virus via at least one network policy device (e.g., the computing device 2402 itself), the virus associated with communication data on a communications network, prioritize transmission of at least one identifier through the at least one network policy device, relative to the communication data, the at least one identifier being associated with an anti-viral agent, and output the at least one identifier from the at least one network policy device, for provision of the anti-viral agent on the communications network, based thereon. In addition, those skilled in the art will understand that computer-executable instructions 2410 may further include one or more instructions sufficient to perform one or more of the operations illustrated and/or described in relation to one or more of FIG. 18 through FIG. 22, but that such operations are not shown expressly herein for sake of clarity.

In FIG. 24, then, the system 2400 includes at least one computing device (e.g., 2402 and/or 2404). The computer-executable instructions 2410 may be executed on one or more of the at least one computing device. For example, the computing device 2402 may implement the computer-executable instructions 2410 and output a result to (and/or receive data from) the computing device 2404. Since the computing device 2402 may be wholly or partially contained within the computing device 2404, the computing device 2404 also may be said to execute some or all of the computer-executable instructions 2410, in order to be caused to perform or implement, for example, various ones of the techniques described herein, or other techniques.

The device 2404 may include, for example, one or more of a server, a personal digital assistant (PDA) or cell phone, a laptop computer, a tablet personal computer, a networked computer, a computing system comprised of a cluster of processors, a workstation computer, and/or a desktop computer. In another example embodiment, the device 2404 may be operable to provide the anti-viral agent to the communications network and prevent, reduce, or inhibit propagation of the virus thereon, using the bypass network. The device 2402 may include, for example and as referenced above, the network policy device 202*a*, and thus may include, for example, a router, a bridge, a network switch, a software-based switch, a hardware-based switch, a gateway, a hub, a converter, a repeater, a proxy, a server, and/or a firewall.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computer program product comprising: one or more non-transitory computer-readable media bearing:
   (a) one or more instructions for determining a virus associated with communication data on a communications network:
   (b) one or more instructions for associating an anti-viral agent with at least one identifier;
   (c) one or more instructions for prioritizing transmission of the at least one identifier relative to the communication data based on a determination of a potential path of the communication data, the determination based on at least one of a topological or a statistical analysis of the communications network; and
   (d) one or more instructions for providing the anti-viral agent on the communications network, in response to the prioritizing transmission of the at least one identifier.

2. A system, comprising:
   a computing device; and
   instructions that when executed on the computing device cause the computing device to:
   (a) determine a virus associated with communication data on a communications network;
   (b) associate an anti-viral agent with at least one identifier;
   (c) prioritize transmission of the at least one identifier relative to the communication data based on a determination of a potential path of the communication data, the determination based on at least one of a topological or a statistical analysis of the communications network; and
   (d) provide the anti-viral agent on the communications network, in response to the prioritizing transmission of the at least one identifier.

3. The system of claim 2, wherein, in causing the computing device to determine a virus associated with communication data on a communications network, the instructions cause the computing device to:
   determine the virus associated with the communication data on the communications network, the communications network including an entity-sponsored intranet.

4. The system of claim 2, wherein, in causing the computing device to determine a virus associated with communication data on a communications network, the instructions cause the computing device to:
   determine the virus associated with the communication data on the communications network, the communications network associated with at least one network policy device that is configured to route a packet based on a packet identifier included within a header of the packet.

5. The system of claim 2, wherein, in causing the computing device to determine a virus associated with communication data on a communications network, the instructions cause the computing device to:
   determine the virus associated with the communication data on the communications network, the communications network associated with at least one network policy device that is associated with a plurality of network policy devices that are configured to provide at least two classes of network traffic management.

6. The system of claim 2, wherein, in causing the computing device to associate an anti-viral agent with at least one identifier, the instructions cause the computing device to:
   determine the anti-viral agent based on the virus; and
   associate the anti-viral agent with the at least one identifier.

7. The system of claim 2, wherein, in causing the computing device to associate an anti-viral agent with at least one identifier, the instructions cause the computing device to:
   label a data packet with the at least one identifier, the data packet being associated with the anti-viral agent.

8. The system of claim 2, wherein, in causing the computing device to associate an anti-viral agent with at least one identifier, the instructions cause the computing device to:
   label a header of a data packet with the at least one identifier, the data packet including at least a portion of the anti-viral agent as payload of the data packet.

9. The system of claim 2, wherein, in causing the computing device to associate an anti-viral agent with at least one identifier, the instructions cause the computing device to:
   associate the anti-viral agent with the at least one identifier, wherein the at least one identifier includes a transmission priority.

10. The system of claim 2, wherein, in causing the computing device to associate an anti-viral agent with at least one identifier, the instructions cause the computing device to:
    associate the anti-viral agent with the at least one identifier, the at least one identifier being associated with a transmission classification in accordance with a transmission classification scheme of the network policy device.

11. The system of claim 2, wherein, in causing the computing device to associate an anti-viral agent with at least one identifier, the instructions cause the computing device to:
    associate the anti-viral agent with the at least one identifier, the at least one identifier being associated with a transmission channel of the network policy device.

12. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
    determine a transmission priority associated with the at least one identifier.

13. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
    determine a forwarding decision of a data packet containing the at least one identifier, based on content of the at least one identifier.

14. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  make a determination of a transmission priority of a data packet containing the at least one identifier, relative to a transmission priority of the communication data; and
  prioritize the transmission of the data packet relative to the communication data, based on the determination.

15. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  replace the at least one identifier with a replacement identifier.

16. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  associate at least a second identifier with the at least one identifier.

17. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide an increased transmission speed of the at least one identifier, relative to the communication data.

18. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide an increased quality of service associated with at least one data packet containing the at least one identifier, relative to the communication data.

19. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide an increased transmission security of the at least one identifier, relative to the communication data.

20. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide an increased available bandwidth for transmission of the at least one identifier, relative to available bandwidth for transmission of the communication data.

21. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide an end-to-end circuit for at least one data packet associated with the at least one identifier, the end-to-end circuit being associated with a specified transmission characteristic.

22. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide prioritized transmission of a class of identifiers, the at least one identifier being associated with the class.

23. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  make a determination that the at least one identifier is associated with an entity; and
  prioritize the transmission of the at least one identifier, based on the determination.

24. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  prioritize queuing of the at least one identifier within the at least one network policy device, relative to queuing of the communication data.

25. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  provide the transmission of the at least one identifier, the at least one identifier including at least one label associated with the Multiprotocol Label Switching protocol (MPLS).

26. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
  receive an indication, from a first entity, of a specified quality of service (QoS) associated with the at least one identifier, at a second entity.

27. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:
    prioritize the transmission, based on a service level agreement between a first entity and a second entity.

28. The system of claim 2, wherein, in causing the computing device to provide the anti-viral agent on the communications network, in response to the prioritizing transmission of the at least one identifier, the instructions cause the computing device to:
    provide the anti-viral agent to at least one network device of the communications network that is ahead of a propagation path of the virus on the communications network.

29. A method, comprising:
    determining a virus associated with communication data on a communications network;
    associating an anti-viral agent with at least one identifier;
    prioritizing transmission of the at least one identifier relative to the communication data based on a determination of a potential path of the communication data, the determination based on at least one of a topological or a statistical analysis of the communications network; and
    providing the anti-viral agent on the communications network, in response to the prioritizing transmission of the at least one identifier,
    wherein at least one of the determining, associating, prioritizing or providing is at least partially implemented using hardware.

30. The method of claim 29, wherein associating an anti-viral agent with at least one identifier comprises:
    associating the anti-viral agent with the at least one identifier, wherein the at least one identifier includes a transmission priority.

31. The method of claim 29, wherein associating an anti-viral agent with at least one identifier comprises:
    associating the anti-viral agent with the at least one identifier, the at least one identifier being associated with a transmission classification in accordance with a transmission classification scheme of a network policy device.

32. The method of claim 29, wherein associating an anti-viral agent with at least one identifier comprises:
    associating the anti-viral agent with the at least one identifier, the at least one identifier being associated with a transmission channel of a network policy device.

33. The method of claim 29, wherein prioritizing transmission of the at least one identifier relative to the communication data based on a determination of a potential path of the communication data, the determination based on at least one of a topological or a statistical analysis of the communications network comprises:
    determining a transmission priority associated with the at least one identifier.

34. The method of claim 29, wherein prioritizing transmission of the at least one identifier relative to the communication data based on a determination of a potential path of the communication data, the determination based on at least one of a topological or a statistical analysis of the communications network comprises:
    making a determination of a transmission priority of a data packet containing the at least one identifier, relative to a transmission priority of the communication data; and
    prioritizing the transmission of the data packet relative to the communication data, based on the determination.

35. The method of claim 29, wherein prioritizing transmission of the at least one identifier relative to the communication data based on a determination of a potential path of the communication data, the determination based on at least one of a topological or a statistical analysis of the communications network comprises:
    providing an increased transmission speed of the at least one identifier, relative to the communication data.

36. The method of claim 29, wherein prioritizing transmission of the at least one identifier relative to the communication data based on a determination of a potential path of the communication data, the determination based on at least one of a topological or a statistical analysis of the communications network comprises:
    providing an increased quality of service associated with at least one data packet containing the at least one identifier, relative to the communication data.

37. The method of claim 29, wherein prioritizing transmission of the at least one identifier relative to the communication data based on a determination of a potential path of the communication data, the determination based on at least one of a topological or a statistical analysis of the communications network comprises:
    providing an increased transmission security of the at least one identifier, relative to the communication data.

38. The method of claim 29, wherein prioritizing transmission of the at least one identifier relative to the communication data based on a determination of a potential path of the communication data, the determination based on at least one of a topological or a statistical analysis of the communications network comprises:
    providing an increased available bandwidth for transmission of the at least one identifier, relative to available bandwidth for transmission of the communication data.

39. The method of claim 29, wherein prioritizing transmission of the at least one identifier relative to the communication data based on a determination of a potential path of the communication data, the determination based on at least one of a topological or a statistical analysis of the communications network comprises:
    making a determination that the at least one identifier is associated with an entity; and
    prioritizing the transmission of the at least one identifier, based on the determination.

40. The method of claim 29, wherein prioritizing transmission of the at least one identifier relative to the communication data based on a determination of a potential path of the communication data, the determination based on at least one of a topological or a statistical analysis of the communications network comprises:
    prioritizing queuing of the at least one identifier within the at least one network policy device, relative to queuing of the communication data.

41. The method of claim 29, wherein prioritizing transmission of the at least one identifier relative to the communication data based on a determination of a potential path of the communication data, the determination based on at least one of a topological or a statistical analysis of the communications network comprises:
    receiving an indication, from a first entity, of a specified quality of service (QoS) associated with the at least one identifier, at a second entity.

42. The method of claim 29, wherein prioritizing transmission of the at least one identifier relative to the communication data based on a determination of a potential path of the communication data, the determination based on at least one of a topological or a statistical analysis of the communications network comprises:

prioritizing the transmission, based on a service level agreement between a first entity and a second entity.

43. The method of claim 29, wherein providing the anti-viral agent on the communications network, in response to the prioritizing transmission of the at least one identifier comprises:

providing the anti-viral agent to at least one network device of the communications network.

44. The method of claim 29, wherein determining a virus associated with communication data on a communications network comprises:

determining a virus associated with communication data on a communications network by at least one of an anti-virus business entity, an anti-malware business entity, or a security entity.

45. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

transmit the at least one identifier through at least one network policy device on a logical bypass network.

46. The system of claim 45, wherein, in causing the computing device to transmit the at least one identifier through the at least one network policy device on a logical bypass network, the instructions cause the computing device to:

transmit the at least one identifier through the at least one network policy device on a logical bypass network including an analog channel on a digital link.

47. The system of claim 45, wherein, in causing the computing device to transmit the at least one identifier through the at least one network policy device on a logical bypass network, the instructions cause the computing device to:

transmit the at least one identifier through the at least one network policy device on a logical bypass network including a lower network layer.

48. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

place one or more packets associated with the at least one identifier in a preferred location in a hardware queue of at least one network policy device.

49. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

increase processing power devoted to the prioritizing the transmission of the at least one identifier of at least one network policy device.

50. The method of claim 29, wherein associating an anti-viral agent with at least one identifier comprises:

associating an anti-viral agent with at least one identifier located in a data packet, the identifier associated with prioritized routing of the data packet to create a logical bypass network.

51. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

prioritize transmission of the at least one identifier relative to the communication data, including at least routing the at least one identifier at a data link layer of a protocol stack.

52. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

prioritize transmission of the at least one identifier relative to the communication data, including at least routing the at least one identifier at a network layer of a protocol stack.

53. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

prioritize transmission of the at least one identifier relative to the communication data, including at least routing the at least one identifier using routing that operates between layers 2 and 3.

54. The system of claim 2, wherein, in causing the computing device to prioritize transmission of the at least one identifier relative to the communication data based on a determination of a potential path of the communication data, the determination based on at least one of a topological or a statistical analysis of the communications network, the instructions cause the computing device to:

associate the at least one identifier with a first hardware queue of a first network policy device;

associate the communication data with a second hardware queue of the first network policy device; and utilize a queue scheduling priority of the first network policy device to prioritize service of the first hardware queue relative to the second hardware queue.

* * * * *